(12) United States Patent
Marui

(10) Patent No.: US 10,464,628 B2
(45) Date of Patent: *Nov. 5, 2019

(54) STEERING APPARATUS WITH FORWARD EXTENDED FORK LEGS

(71) Applicant: Shinji Marui, Kobe (JP)

(72) Inventor: Shinji Marui, Kobe (JP)

(*) Notice: Subject to any disclaimer, the term of this patent is extended or adjusted under 35 U.S.C. 154(b) by 63 days.

This patent is subject to a terminal disclaimer.

(21) Appl. No.: 15/726,220

(22) Filed: Oct. 5, 2017

(65) Prior Publication Data

US 2018/0037292 A1    Feb. 8, 2018

Related U.S. Application Data

(63) Continuation of application No. 15/422,037, filed on Feb. 1, 2017, now Pat. No. 9,815,515, which is a
(Continued)

(30) Foreign Application Priority Data

Aug. 2, 2014 (JP) ................................ 2014-158274

(51) Int. Cl.
*B62K 21/02* (2006.01)
*B62K 21/04* (2006.01)
(Continued)

(52) U.S. Cl.
CPC .............. *B62K 21/18* (2013.01); *B62K 21/02* (2013.01); *B62K 21/04* (2013.01); *B62K 21/24* (2013.01)

(58) Field of Classification Search
CPC ........ B62K 21/00; B62K 21/02; B62K 21/04; B62K 21/12; B62K 21/18; B62K 21/24
See application file for complete search history.

(56) References Cited

U.S. PATENT DOCUMENTS 1,527,133 A * 2/1925 Harley ................... B62K 25/08
                                                          280/277
1,830,916 A * 11/1931 Siebert ................... B62K 21/12
                                                          280/276
(Continued)

FOREIGN PATENT DOCUMENTS

DE             494664 C  *  4/1930  ............. B62K 21/18
DE    102008024604 A1 * 12/2009  ............. B62K 21/04
(Continued)

OTHER PUBLICATIONS

Office Action dated Dec. 21, 2017 from related U.S. Appl. No. 14/815,097.

*Primary Examiner* — Joseph M Rocca
*Assistant Examiner* — Maurice L Williams
(74) *Attorney, Agent, or Firm* — Innovation Capital Law Group, LLP; Vic Lin

(57) ABSTRACT

A steering apparatus with forward extended fork legs includes left and right fork legs that extend from a wheel axle all the way up to a handlebar. Top fork portions support a handlebar in a more forward location. A mid-fork portion of each fork leg is positioned in front of the steering column to provide more clearance room for the rider's knees. e top ends of the fork legs are positioned a forward distance in front of the vertical axis defined by the steering column. Each fork leg may be tilted forward with respect to the steering column and may also include a forward bend to direct portions of each fork leg towards the front.

23 Claims, 23 Drawing Sheets

Related U.S. Application Data continuation of application No. 14/815,097, filed on Jul. 31, 2015, now Pat. No. 10,155,560.

(60) Provisional application No. 62/290,918, filed on Feb. 3, 2016.

(51) Int. Cl.
*B62K 21/18* (2006.01)
*B62K 21/24* (2006.01)

(56) References Cited

U.S. PATENT DOCUMENTS

| | | | | |
|---|---|---|---|---|
| 2,768,836 A * | 10/1956 | Hilber | | B62K 25/08 280/276 |
| 3,295,863 A * | 1/1967 | Jaulmes | | B62K 15/00 280/278 |
| 3,331,617 A * | 7/1967 | Jacoby | | B62K 21/12 280/279 |
| 3,354,975 A * | 11/1967 | Stuart | | B62K 15/008 180/208 |
| 3,366,193 A * | 1/1968 | Campbell | | B62K 11/04 180/227 |
| 3,513,926 A * | 5/1970 | Paget, Jr. | | B62K 15/006 180/208 |
| 3,620,547 A | 11/1971 | Vaverek | | |
| 3,623,749 A | 11/1971 | Jensen | | |
| 3,811,705 A * | 5/1974 | D'Ambra | | B62K 21/02 280/276 |
| 4,111,447 A * | 9/1978 | Ishida | | B62K 15/008 280/261 |
| 4,147,371 A | 4/1979 | Morita et al. | | |
| 4,268,055 A * | 5/1981 | Bell | | B62K 3/10 280/278 |
| 4,274,647 A * | 6/1981 | Drake, Jr. | | B62K 3/002 180/181 |
| 4,284,288 A | 8/1981 | Fulton | | |
| 4,379,566 A * | 4/1983 | Titcomb | | B62K 21/18 280/251 |
| 4,512,592 A * | 4/1985 | Yoshioka | | B62K 21/08 280/277 |
| 4,542,910 A * | 9/1985 | Watanabe | | B62K 25/16 280/276 |
| 4,611,684 A | 9/1986 | Geschwender | | |
| 4,691,930 A | 9/1987 | Samuel | | |
| 4,705,285 A * | 11/1987 | Yoshida | | B62K 25/08 280/277 |
| 5,017,047 A | 5/1991 | Myles et al. | | |
| 5,257,553 A * | 11/1993 | Cheng | | B62M 1/16 280/233 |
| 5,855,388 A * | 1/1999 | Brewer | | B62J 11/00 224/424 |
| 6,176,503 B1 * | 1/2001 | George | | B62K 11/14 180/219 |
| 6,694,842 B1 * | 2/2004 | Chen | | B62K 9/00 280/279 |
| 6,712,541 B1 * | 3/2004 | Henricksen | | B62K 21/04 403/344 |
| 7,118,302 B1 * | 10/2006 | Durham | | B62K 21/04 403/344 |
| 7,163,224 B1 * | 1/2007 | Song | | B62K 11/14 280/276 |
| 7,360,963 B1 * | 4/2008 | Burns | | B62K 21/04 280/279 |
| 7,909,345 B1 * | 3/2011 | Olson | | B62K 21/04 280/276 |
| 8,720,928 B2 | 5/2014 | Delpit et al. | | |
| 8,783,704 B2 * | 7/2014 | Richards | | B62K 25/04 280/275 |
| 2004/0031349 A1 * | 2/2004 | Chen | | B62K 9/02 74/551.3 |
| 2005/0116442 A1 * | 6/2005 | Law | | B62K 11/14 280/279 |
| 2005/0211010 A1 * | 9/2005 | Zimmerman | | B62K 11/14 74/551.1 |
| 2005/0257978 A1 * | 11/2005 | Sigfrid | | B62K 11/14 180/219 |
| 2008/0258424 A1 * | 10/2008 | Paul | | B62K 25/16 280/276 |
| 2009/0007714 A1 * | 1/2009 | Carlini | | B62K 11/14 74/492 |
| 2010/0186542 A1 * | 7/2010 | Hashimoto | | B21D 53/86 74/551.1 |
| 2011/0121538 A1 * | 5/2011 | Giroux | | B62K 19/32 280/280 |
| 2014/0165773 A1 * | 6/2014 | Montero Basqueseaux | | B62K 15/00 74/551.3 |

FOREIGN PATENT DOCUMENTS

| | | | | |
|---|---|---|---|---|
| EP | 2426042 A1 * | 3/2012 | | B62J 9/003 |
| FR | 1479509 A * | 5/1967 | | B62K 21/02 |
| FR | 2860487 A1 | 4/2005 | | |
| GB | 243292 A * | 11/1925 | | B62K 21/02 |
| GB | 722457 A * | 1/1955 | | B62K 21/18 |
| JP | S616086 A | 1/1986 | | |
| JP | S61135880 A | 6/1986 | | |
| JP | 2013068310 A * | 4/2013 | | B62K 25/08 |
| WO | WO-8302598 A1 * | 8/1983 | | B62K 3/002 |

* cited by examiner

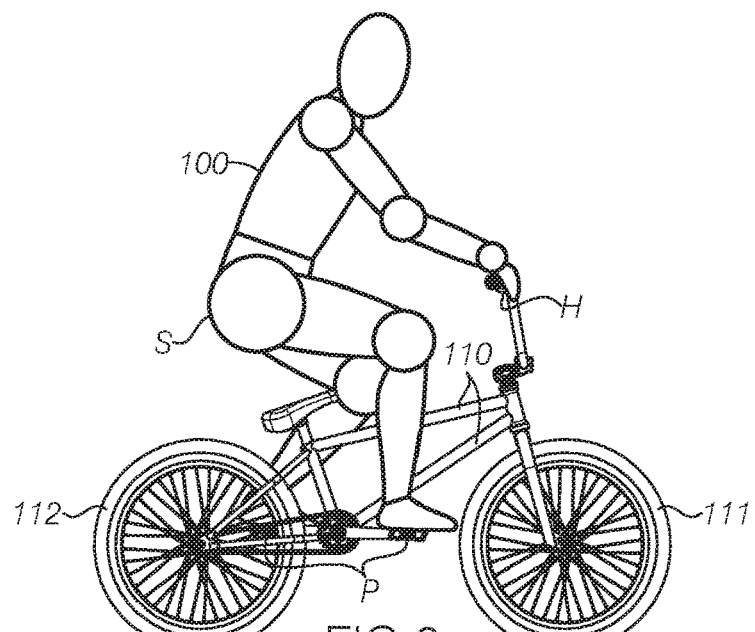
FIG.8
PRIOR ART
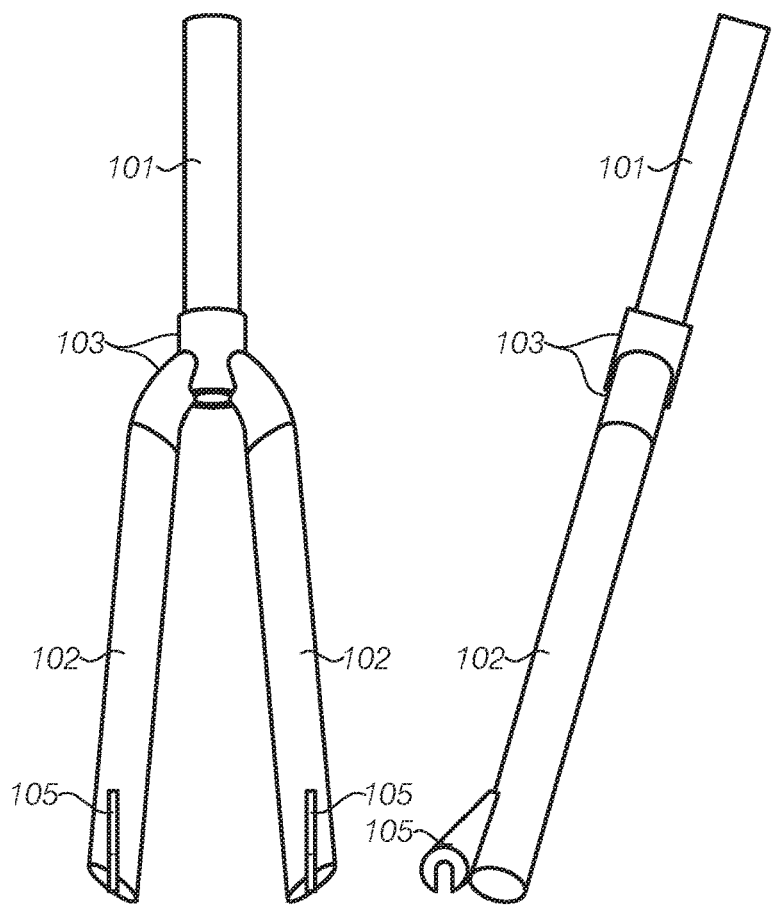
FIG.9A
PRIOR ART
FIG.9B
PRIOR ART

STEERING APPARATUS WITH FORWARD EXTENDED FORK LEGS

CROSS-REFERENCE TO RELATED APPLICATIONS

This application is a continuation of U.S. patent application Ser. No. 15/422,037, filed Feb. 1, 2017, which (1) claims the benefit of priority of U.S. provisional application No. 62/290,918, filed Feb. 3, 2016, and (2) is a continuation-in-part of U.S. patent application Ser. No. 14/815,097, filed Jul. 31, 2015.

BACKGROUND OF THE INVENTION

1. Field of the Invention

One or more embodiments of the invention relate to fork leg apparatuses or handle structures that couple a steering handle bar or other objects to a wheel.

2. Description of Prior Art and Related Information

In certain riding situations, such as competitive racing, a rider may require greater clearance for the knees and legs up around the head tube. This may be particularly true when a racer is crouching at the starting line of a race. Conventional fork leg arrangements do not provide sufficient room for the rider's lower body.

SUMMARY OF THE INVENTION

In one aspect, a steering apparatus with dual forward extended fork legs is configured for use with a bicycle or other riding vehicle. The steering apparatus comprises a steering column, a first fork leg extending along a first side of the steering column, and a second fork leg extending along a second side of the steering column. The first fork leg comprises a first top fork portion. The second fork leg comprises a second top fork portion. The first top leg portion and the second top fork portion extend upwardly and forwardly from a top end of the steering column. The first and second top fork portions are configured to support an object which may comprise a steering handle bar.

The steering column defines a first axis. The first top fork portion and the second top fork portion collectively define a top fork end position in the range of 1 to 12 inches in front of and perpendicular to the first axis.

The apparatus may further comprise a lower crown and an upper crown coupled to the steering column. The lower crown may define a first pair of angled bores, and the upper crown may define a second pair of angled bores. The first fork leg and the second fork leg may be substantially linear.

The apparatus may also comprise bent fork legs. The first fork leg may comprise a first bend that directs the first top fork portion forward with respect to the steering column. The second fork leg may comprise a second bend that directs the second top fork portion forward with respect to the steering column.

In a further aspect, a steering apparatus comprises a steering column, a first fork leg and a second fork leg. The first fork leg extends along a first side of the steering column and comprises a first top fork portion. The second fork leg extends along a second side of the steering column and comprises a second top fork portion. The steering column comprises a top end and defines a first axis. The first top fork portion and the second top fork portion extend upwardly and forwardly from the top end of the steering column such that the first top fork portion and the second top fork portion collectively define a top fork end position in the range of 1 to 12 inches in front of and perpendicular to the first axis. A steering handle bar may be coupled to the first top fork portion and the second top fork portion.

The apparatus may further comprise a lower crown and an upper crown coupled to the steering column. The lower crown may define a first pair of angled bores. The upper crown may define a second pair of angled bores. The first fork leg and second fork leg may be substantially linear.

The first fork leg and second fork leg may each be bent forward. The first fork leg may comprise a first bend that directs the first top fork portion forward with respect to the steering column. The second fork leg may comprise a second bend that directs the second top fork portion forward with respect to the steering column.

BRIEF DESCRIPTION OF THE DRAWINGS

Some embodiments of the present invention are illustrated as an example and are not limited by the figures of the accompanying drawings, in which like references may indicate similar elements.

FIG. 6A-2 is a top perspective view of the preferred apparatus;

FIG. 6B-1 is a rear perspective view of the preferred apparatus;

FIG. 6B-2 is a top perspective view of the preferred apparatus;

FIG. 6C-1 is a rear perspective view of the preferred apparatus;

FIG. 6C-2 is a top perspective view of the preferred apparatus;

FIG. 8 is a schematic view of a rider on a bicycle;

FIG. 9A is a front view of a conventional prior art handle structure;

FIG. 9B is a side view of a conventional prior art handle structure; (1) is a front view; (2) is a side view;

DETAILED DESCRIPTION OF THE PREFERRED EMBODIMENTS AND BEST MODE OF INVENTION

One example of a preferred embodiment of a steering apparatus according to the present invention will now be described with reference to the drawings. A scope of the present invention is not limited to the following embodiment or drawings; various forms or adaptations are possible within the scope of the technical idea of the present invention.

Figures 1A, 1B:
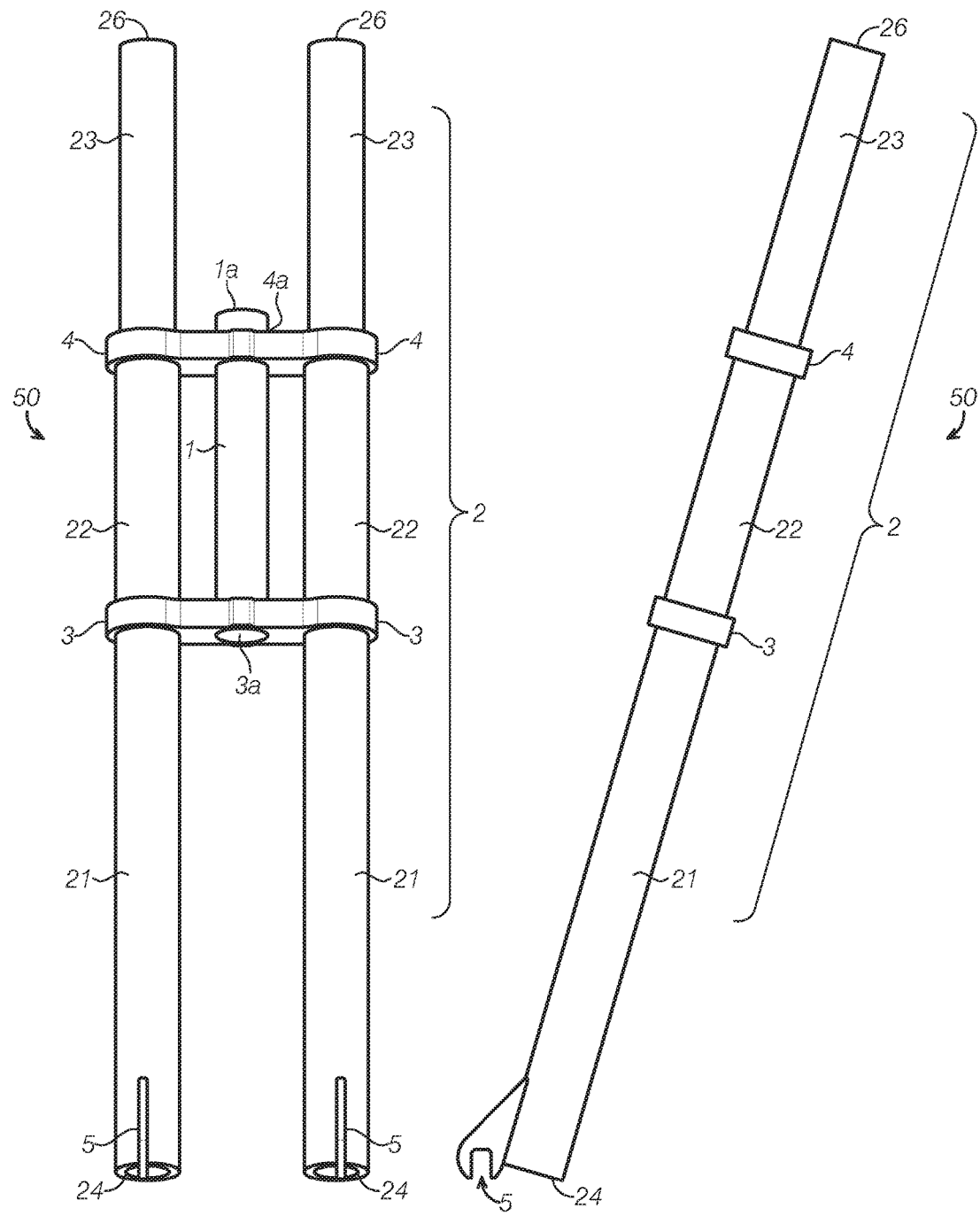
FIG. 1A is a front view of a preferred embodiment of a steering apparatus.
FIG. 1B is a side view of the preferred apparatus.

One preferred embodiment of a steering apparatus, or handle structure, 50 pursuant to the present invention will now be described with reference to FIGS. 1A, 1B and 2. The steering apparatus, or simply apparatus, 50 is preferably configured for use in connection with bicycles, motorcycles or any other vehicles requiring steering.

A preferred embodiment of the apparatus 50 comprises a steering column 1 rotatably supported by and within the head tube 13 of the front frame 10, and left and right fork legs 2 extending vertically along a left and right side of the steering column 1. The two fork legs 2 preferably extend from bottom to top in a non-converging manner and may extend in parallel in a preferred embodiment. The axle of the front wheel 11 is rotatably supported by a dropout, or notch, 5 at a bottom end of the left and right fork legs 2. A top fork portion 23 of each fork leg 2 adequately projects upward from a position of a top end 1a of the steering column 1 all the way up to a top face or top edge 26. In the preferred embodiment, the top face 26 of each fork leg 2 is spaced approximately at least 50 mm from the top end 1a of the steering column, and preferably in the range of 150 mm-160 mm, and all the way up 200 mm. Therefore, it will be appreciated that a vertical distance in the range of 20 mm to 200 m is provided between the top of the steering column 1 and the bottom of the mounted object. In a preferred embodiment, the apparatus 50 provides a vertical space of at least 20 mm between a bottom of the mounted object to the top end of the steering column 1. For example, where the mounted object comprises brackets attached to the top fork portions 23, a bottom of the bracket may be positioned beneath the top edges 26 of the fork legs 2. Therefore, while the top edges 26 of the fork legs 2 are at least 50 mm higher than the top end of the steering column 1, the vertical spacing between the top end of the steering column 1 to the bottom surface of the mounted object may be less (e.g., at least 20 mm) due to the possibility that the bottom surface of the mounted object may be positioned beneath the top edges 26 of the fork legs 2.

The preferred apparatus 50 comprises two split couplers 6a, 6b, one 6a, 6b attached to each top fork portion 23 of the right and left fork legs 2. An object, such as a steering handle bar 7, is attached to join together the two split couplers (6a, 6b).

The apparatus 50 may also comprise a variety of other connectors (e.g., clamps, clips, brackets, etc.) that may be coupled to anywhere along the length of each top fork portion 23 to vary the desired height of the object supported by the fork legs 2. Since the apparatus 50 preferably comprises two separate fork legs 2 that do not intersect, the preferred embodiment comprises a pair of connectors, one for each fork leg, that will join the fork legs 2 to the object supported preferably at or adjacent to the top of the fork legs 2.

The object supported at the top of the upwardly extending pair of fork legs 2 may comprise a variety of different steering mechanisms, carriers, connectors or other structures. As examples and not by way of limitation, the object may comprise a case for holding and displaying electronic devices such as smartphones.

The right and left fork legs 2 are inserted through penetration holes, or openings, disposed at right and left end portions of a lower fork crown 3 that is positioned adjacent to a bottom end, and through an upper fork crown 4 positioned adjacent to a top end. By inserting the steering column 1 through penetration holes (3a, 4a) disposed at a center, above and below the pair of fork crowns (3, 4), the fork legs 2 are stably attached along the left and right sides of the steering column 1.

The fork legs 2 define a shape that extends upwardly in a non-converging manner compared to the converging fork legs 102 of the prior art shown in FIG. 9. Therefore, the apparatus 50 comprises a pair of fork legs 2 that extend vertically from the axle all the way up to the steering mechanism or other object supported at the top edges 26 of the legs, while maintaining a horizontal distance or lateral spacing therebetween throughout the length of the fork legs 2. The horizontal spacing between the pair of fork legs 2 may vary from bottom to top so long as no portion of one leg 2 touches any portion of the other leg 2. The pair of fork legs 2 may be generally parallel to each other or slightly tilted toward or away from each other. In the preferred embodiment, the fork legs 2 do not converge such that no portion of the right fork leg touches any portion of the left fork leg.

Each fork leg 2 comprises three portions: a bottom fork portion 21, a middle fork portion 22, and a top fork portion 23. Preferably, these three fork portions 21, 22, and 23 are integrated in each fork leg 2. In other words, they are composed as one monolithic pipe. The bottom fork portions 21 replace the prior art fork legs 102. The middle fork portions 22 are linked or coupled to the steering column 1 by the lower fork crown 3 and the upper fork crown 4. The top fork portions 23 maintain a notable height difference between the steering handle bar 7 and a joint position of the upper fork crown 4 and the steering column 1.

Figure 3:
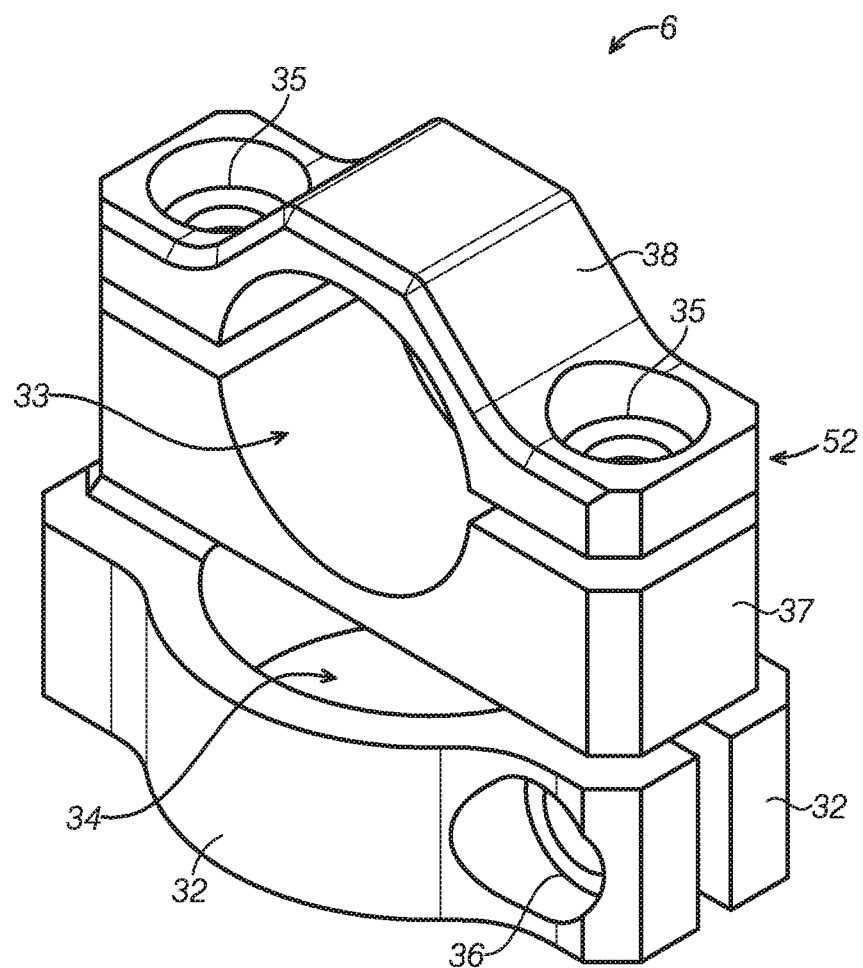
FIG. 3 is a perspective view of a preferred split coupler.
Figure 4A:
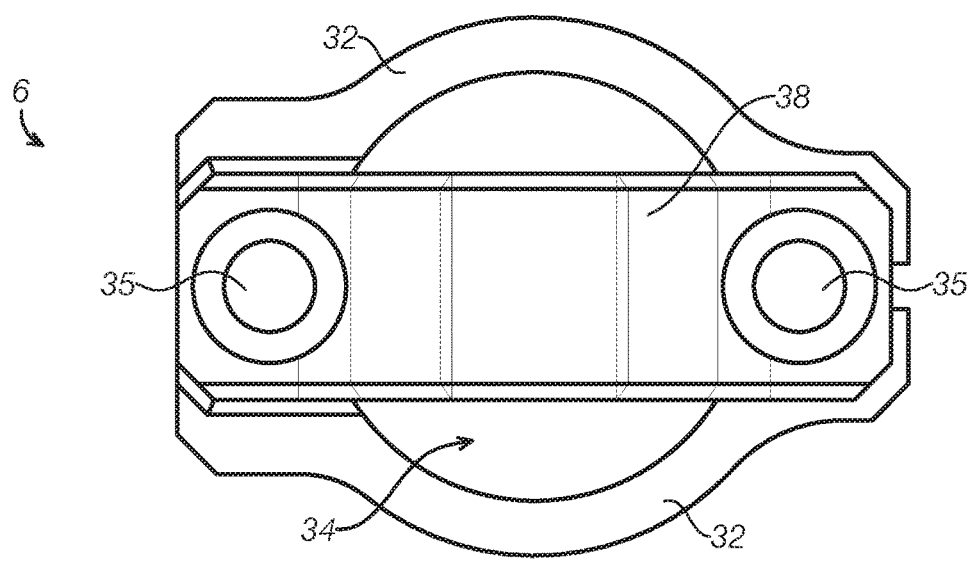
FIG. 4A is a top view of the preferred split coupler.
Figure 4B:
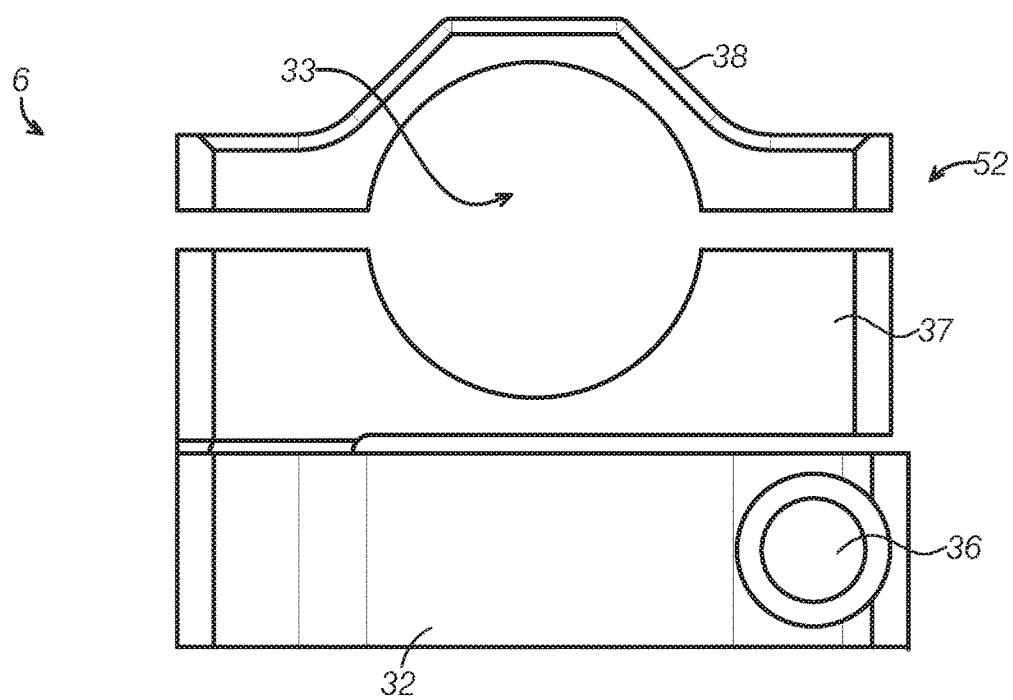
FIG. 4B is a front view of the preferred split coupler.

A preferred split coupler 6 suitably used for the apparatus 50 pursuant to the present invention will now be described with reference to FIGS. 3, 4A and 4B. FIG. 3 is a perspective view of the split coupler 6. FIG. 4A is a plan view of the split coupler 6. FIG. 4B is a front view of the split coupler 6.

The split coupler 6 shown in FIG. 3 comprises a base 32 and a clamp 52. In the preferred embodiment, the base 32 is anchored to a top fork portion (not shown in the drawing) of the fork leg, preferably at or adjacent to the top edge. The split coupler 6 also comprises a clamp with clamp portions 37, 38 that are anchored to the steering handle bar (not shown in the drawing). A top fork portion (not shown in the drawing) of the fork leg that is inserted through a base penetration hole 34 is anchored by tightening the pair of base members 32, 32 with a bolt inserted through a bolt hole 36 which may be internally threaded. The steering handle bar (not shown in the drawing) that is inserted through a clamp penetration hole 33 is anchored by tightening the two clamp members 37, 38 by inserting bolts through bolt holes 35 which may be internally threaded.

Figure 12:
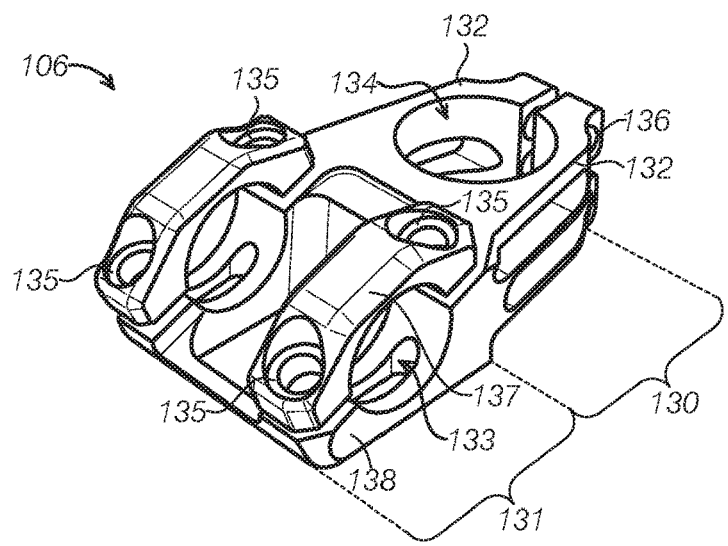
FIG. 12 is explanatory view of a conventional prior art stem structure.

The preferred split coupler 6 shown in FIG. 3 is different from the conventional stem structure depicted in FIG. 12. Clamp portions 37, 38 are disposed directly above the base penetration hole 34 defined by the base 32. For that reason, the steering handle bar (not shown in the drawing) that is inserted through the clamp penetration hole 33 is positioned directly above the top edge of each fork leg that is inserted through the base penetration hole 34 as shown more clearly in FIGS. 2 and 5.

Figure 5:
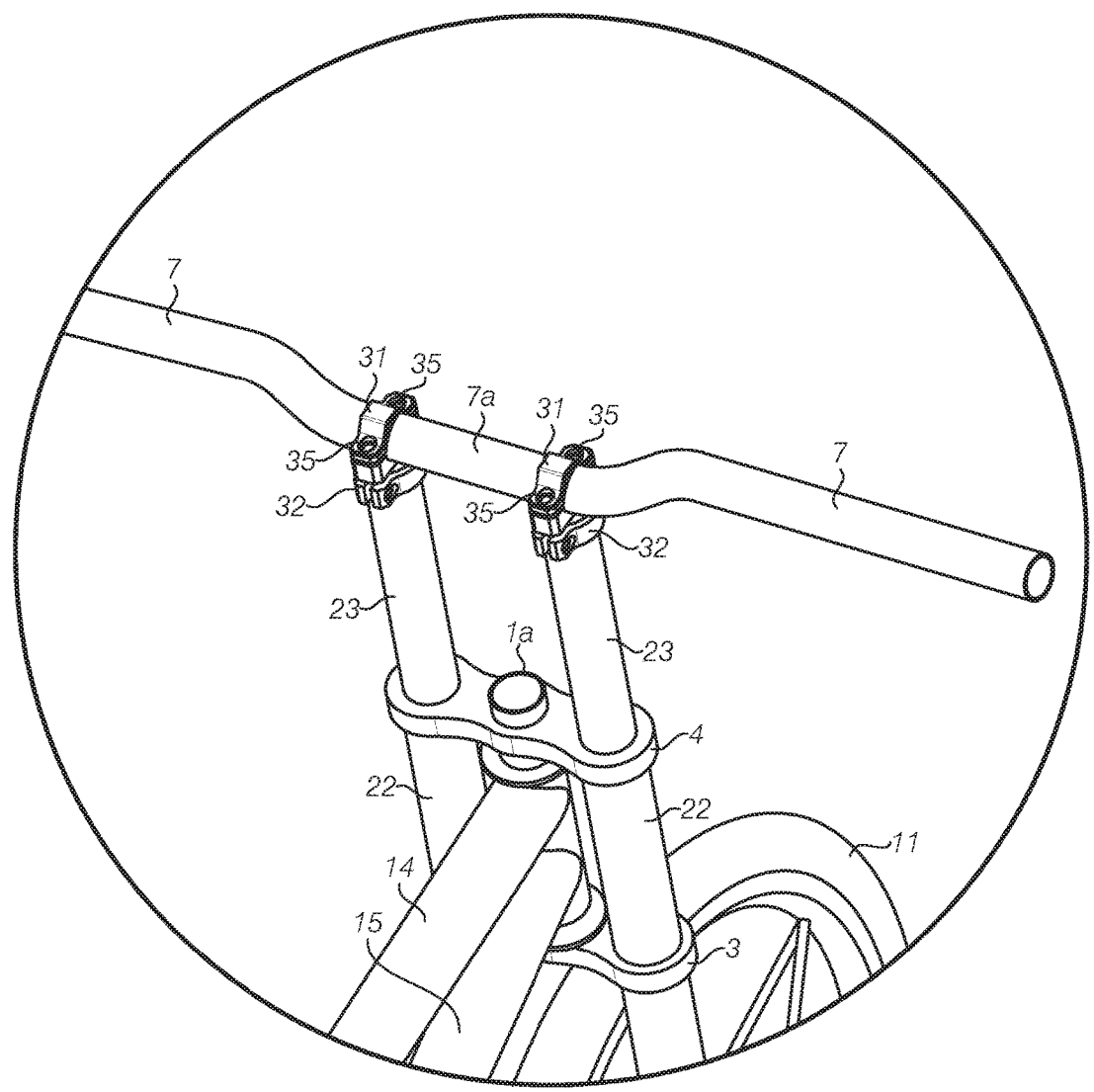
FIG. 5 is a rear perspective view of the preferred apparatus.

FIG. 5 shows the pair of fork legs and steering handle bar seen from the saddle.

The left and right top fork portions 23 pass through penetration holes disposed at left and right sides of the fork crown 4, and project upward from positions of the top end 1a of the steering column. The split coupler base 32 described above is anchored to the top fork portions of the left and right top fork portions 23. Also, the top clamp portion 38 is disposed directly above the base 32, and the steering handle bar 7 is anchored directly above the top edge of each top fork leg portion 23.

Figures 1, 6A:
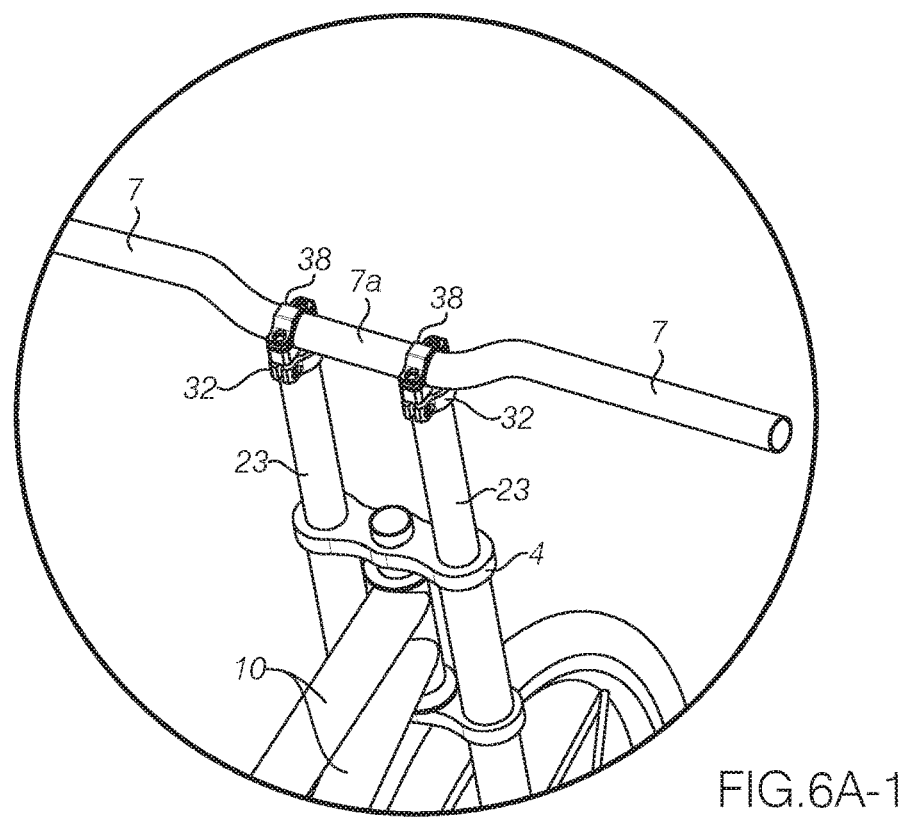
FIG. 6A-1 is a rear perspective view of the preferred apparatus.
Figures 2, 6A:
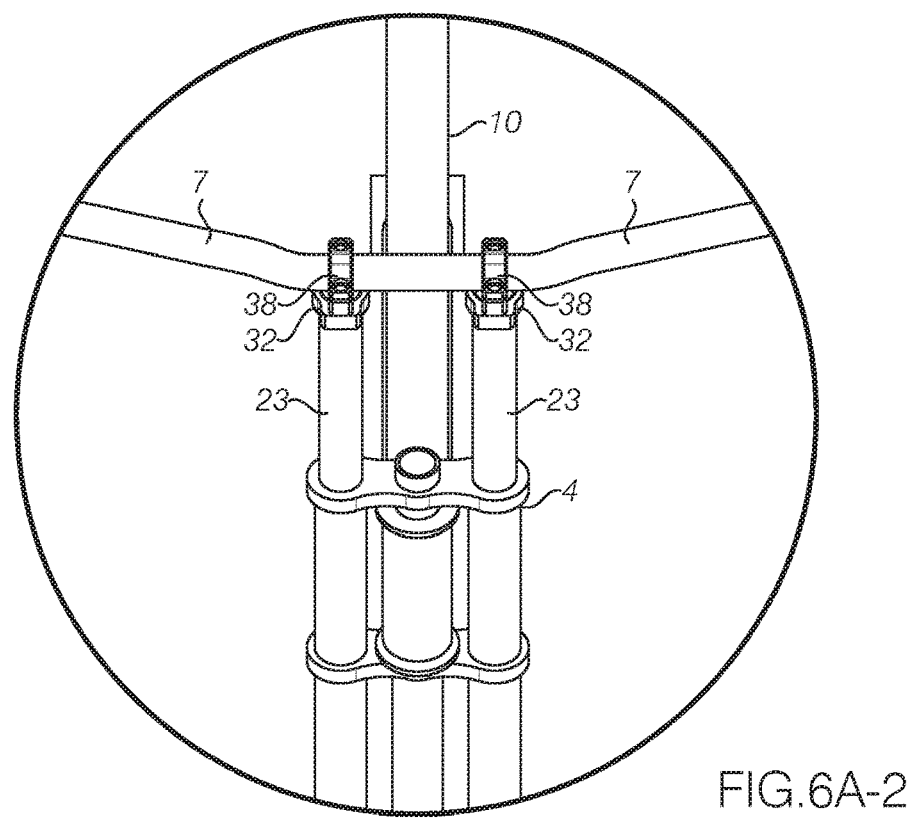

Next, a relationship of attachment positions of the top fork portion 23 and the steering handle bar 7 will now be described with reference to FIG. 6. FIG. 6A-1 and 6A-2 show the apparatus described thus far. There is a notable vertical height difference between the upper fork crown 4 and the pair of split couplers 6. The steering handle bar 7 is anchored directly above the top fork portions of the two top fork portions 23. In other words, the steering handle bar 7 is anchored directly above the top fork portion, without an offset to the front or to the rear from a center of the top fork portions 23.

Figure 2:
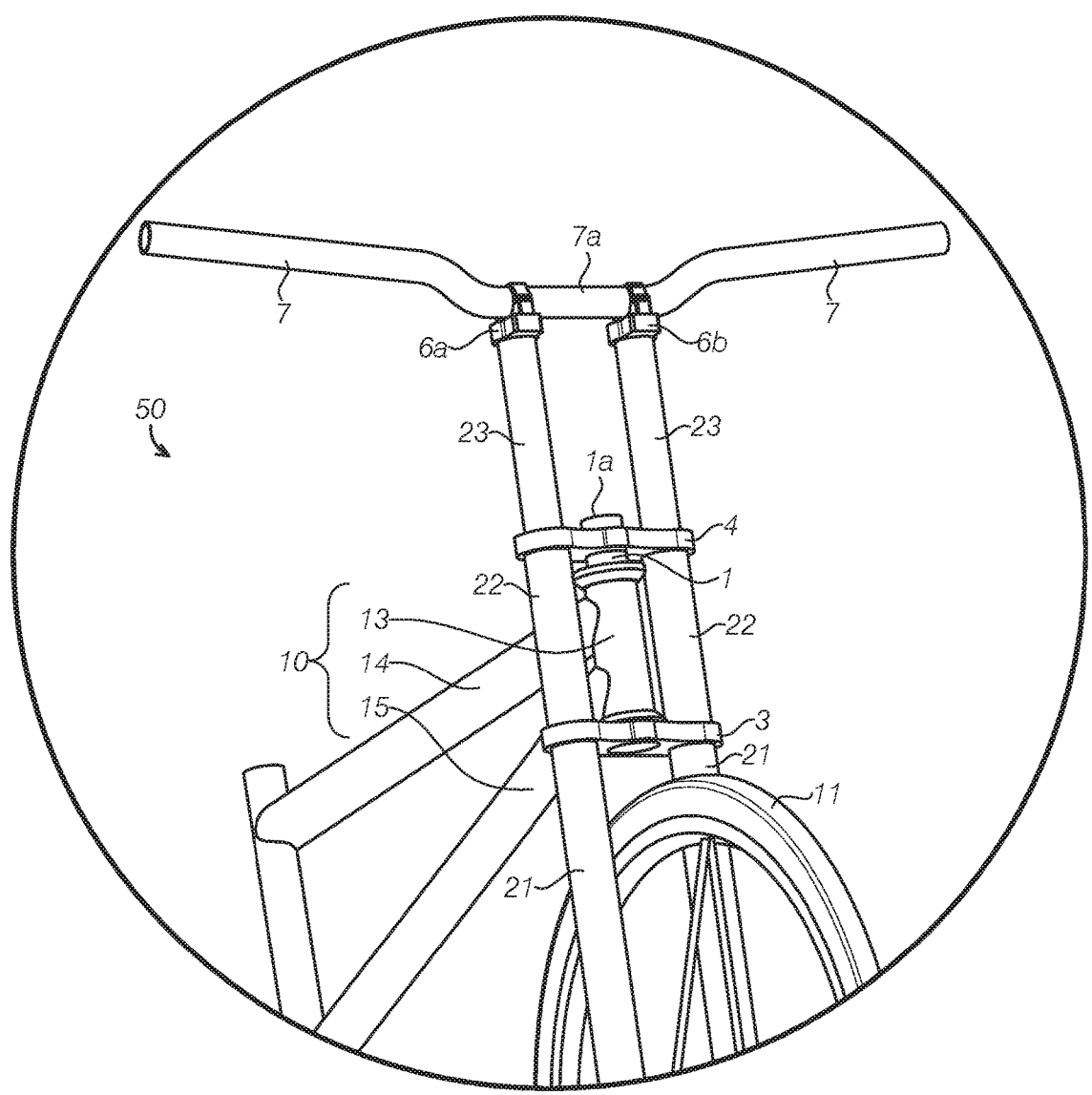
FIG. 2 is a front perspective view of the preferred apparatus.
Figures 1, 6B:
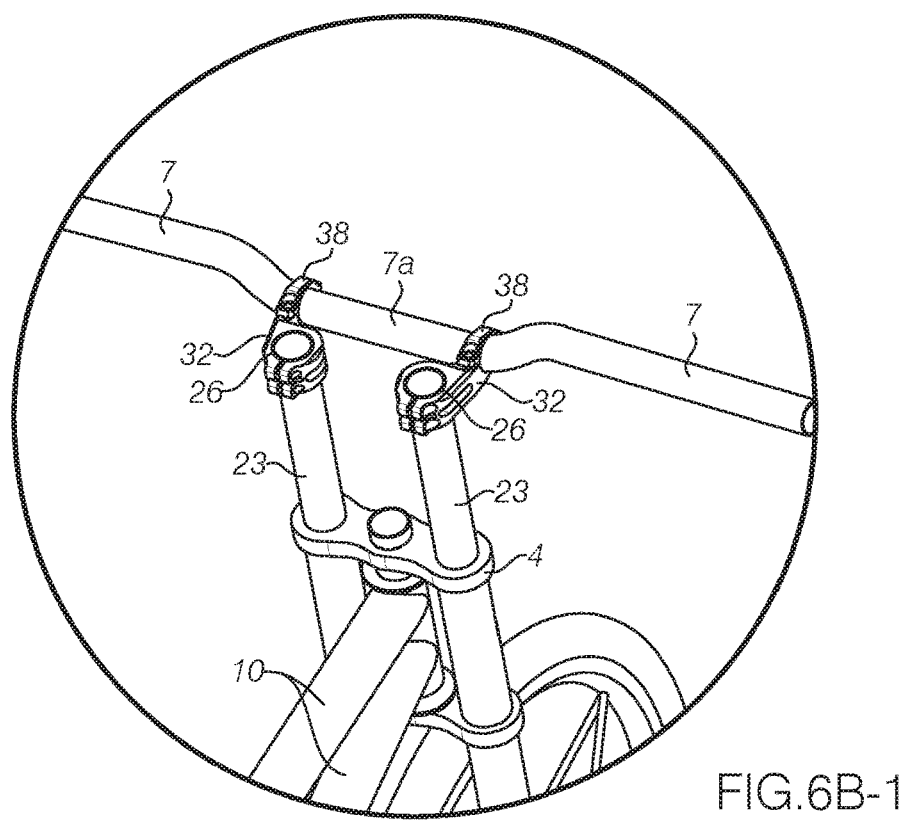
Figures 2, 6B:
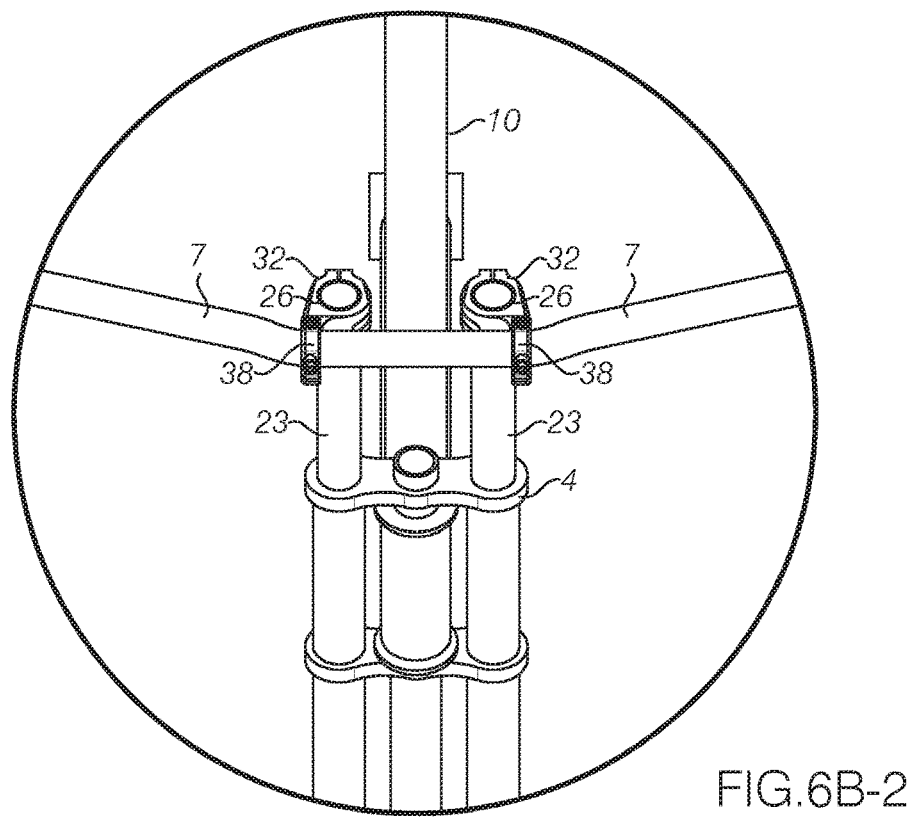

Conversely, with the apparatus shown in FIGS. 6B-1 and 6B-2, the clamp portions 38 are disposed outside and not directly above the clamp base 32 of the split coupler. Also, the steering handle bar 7 is anchored offset to the front from a center of the top edge of the fork leg 23.

Figures 1, 6C:
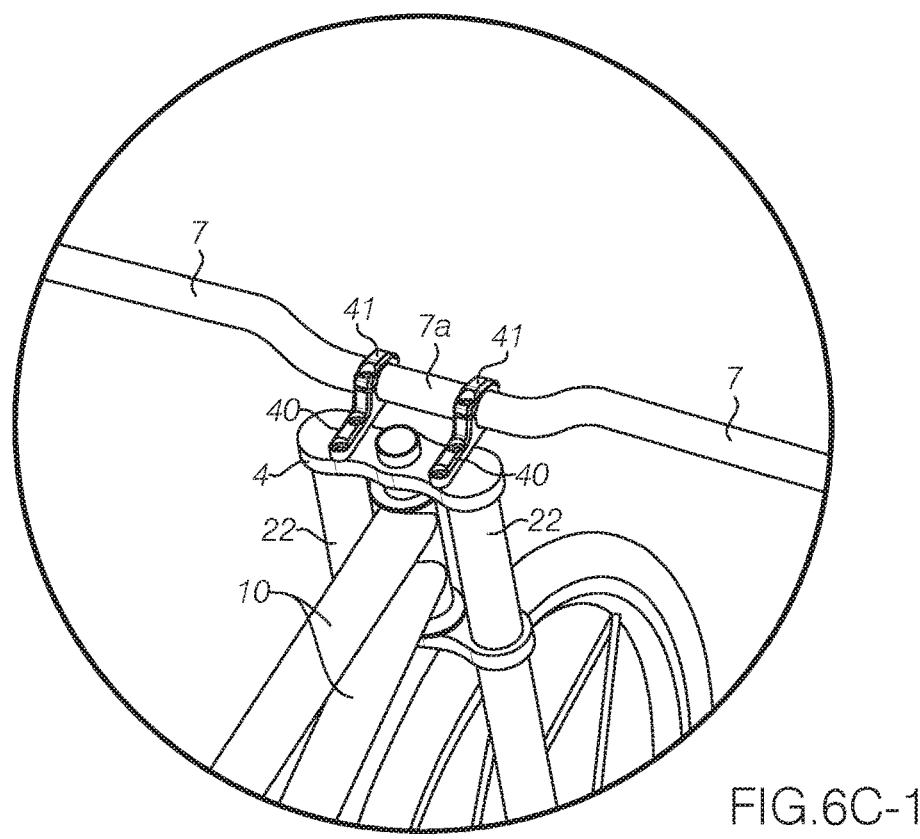
Figures 2, 6C:
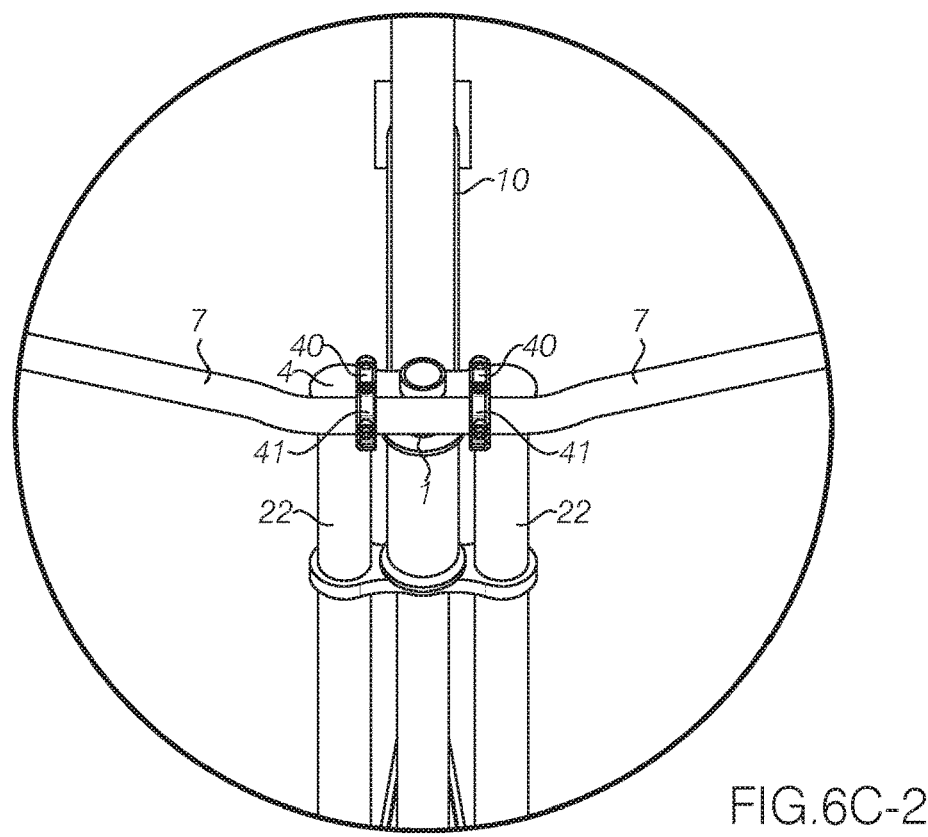

In an alternative embodiment of a handle structure shown in FIGS. 6C-1 and 6C-2, there are no top fork portions 23 as in the previous preferred embodiment. A pair of split couplers 40, 41 are attached directly to the top ends of the top fork crown 4. Each split coupler 43 comprises a base 40 coupled to the top fork crown and a clamp 41 receiving the handle bar 7. There is no vertical height difference between the top fork crown 4 and the split couplers 43. In the case of FIGS. 6C-1 and 6C-2, the clamps 41 are disposed offset to the front from the center of the top end face of the middle fork portions 22, and the steering handle bar 7 is anchored.

Figure 7A:
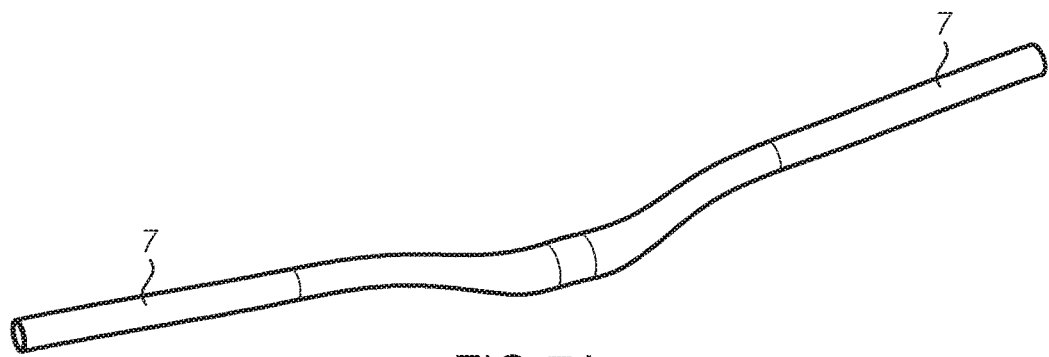
FIG. 7A is a perspective view of the preferred handle bar.
Figure 7B:
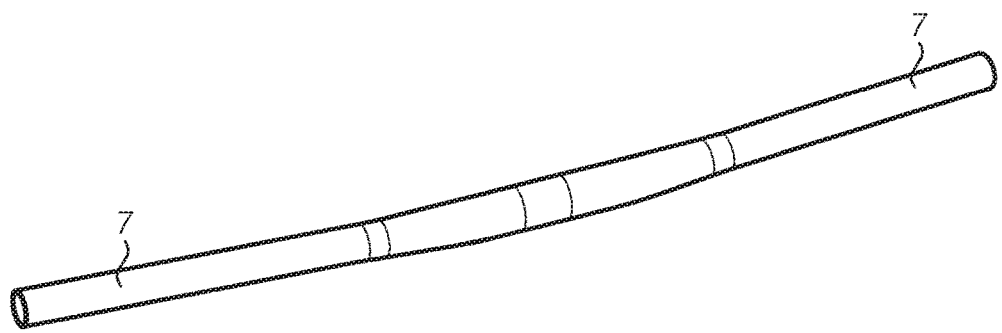
FIG. 7B is a top view of the preferred handle bar.
Figure 10:
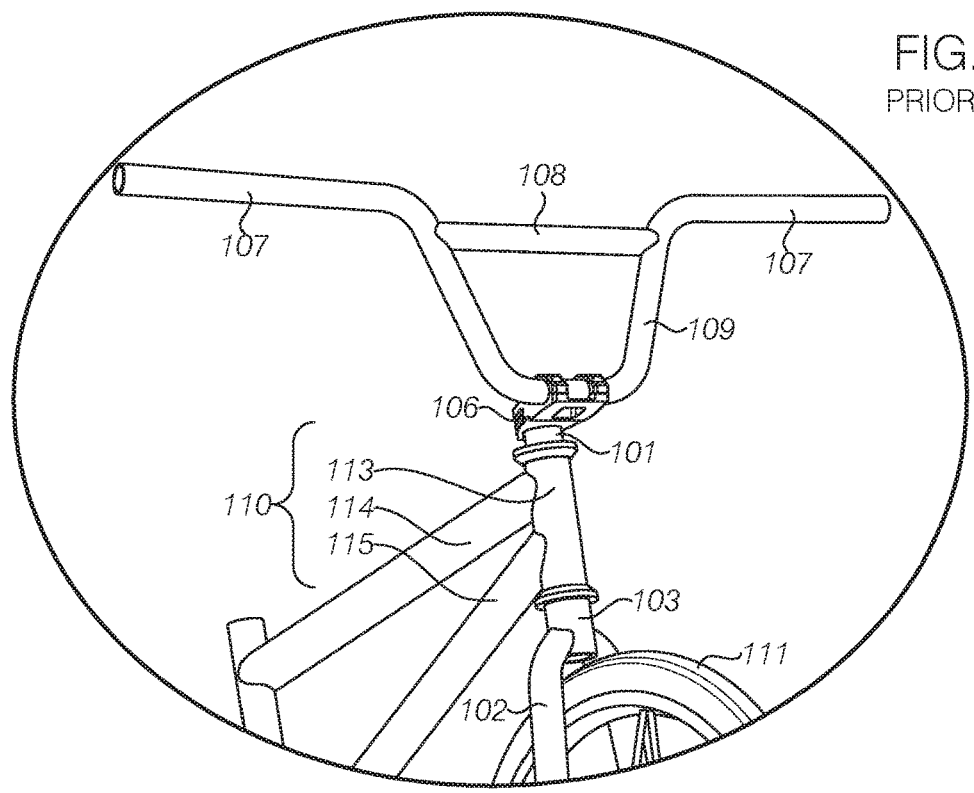
FIG. 10 is explanatory view 2 of the conventional prior art handle structure.
Figure 11:
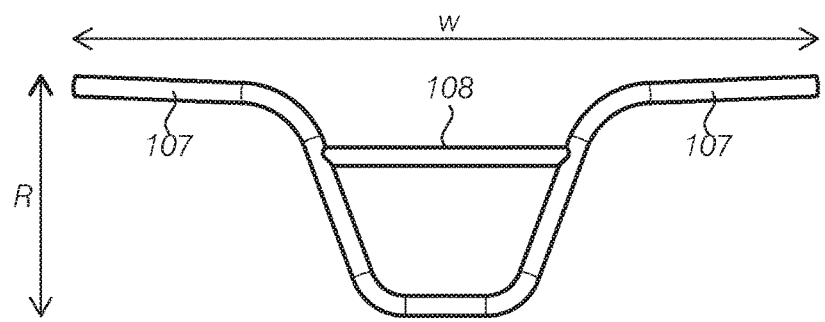
FIG. 11 is an explanatory view of the conventional handle bar prior art.

FIG. 7A shows an example of a handle bar. FIG. 7-A shows a steering handle bar 7 that has a slight rise (height). FIG. 7-B shows a steering handle bar 7 with no rise (height). Either type of steering handle bar can be used. The top edges of the left and right fork legs adequately project upward from the top end of the steering column. The split couplers attached at each top edge of the left and right fork legs anchor the steering handle bar, so a rise (height) is not required for the steering handle bar, and a stronger, flat steering handle bar can be used.

In the illustrated embodiment employing a pair of split couplers 6a, 6b, each split coupler 6a, 6b is preferably attached to a top edge of each top fork portion. However, it is to be expressly understood that the split couplers 6a, 6b or other suitable connectors may be attached to any part of each top fork portion 23 to provide the desired height of the object, such as a steering handle bar, supported by the fork legs.

The present invention is useful as a steering apparatus for sporting usages, particularly for bicycles, kick scooters, motorcycles and other motorized two-wheeled vehicles, and any other sport or exercise equipment using handles or handlebars.

FIGS. 13-27 show preferred embodiments of steering apparatuses with forward extended fork legs including left and right fork legs that extend from a wheel axle all the way up to a handlebar. Top fork portions support a handlebar in a more forward location. The pair of fork legs may be held in a tilted configuration by upper and lower crowns with angled bores such that the top ends of the fork legs are positioned a forward distance in front of the vertical axis defined by the steering column. Alternatively, the pair of fork legs may each comprise a forward bend that directs a top fork portion and/or a mid-fork portion of each leg to extend upwardly and forwardly from the vertical axis of the steering column.

In FIGS. 13-16, a first preferred embodiment of a forward extended dual fork steering apparatus 110 comprises a lower crown 120 and an upper crown 122 that receive a pair of fork legs 112 extending upwardly and forwardly from a wheel axle 114. The lower crown 120 and the upper crown 122 are coupled to a steering column 130 that defines a vertical axis A that is generally perpendicular to the ground upon which a wheel 116 of the bicycle rolls. Each fork leg 112 defines an axis F that upwardly diverges from the steering column axis A. Alternatively stated, the fork leg axis F downwardly converges toward the steering column axis A. Thus, the forwardly extending dual fork legs 112 define an angle 132 from the steering column axis A that is preferably in the range of 3 degrees to 10 degrees.

Figures 13, 14:
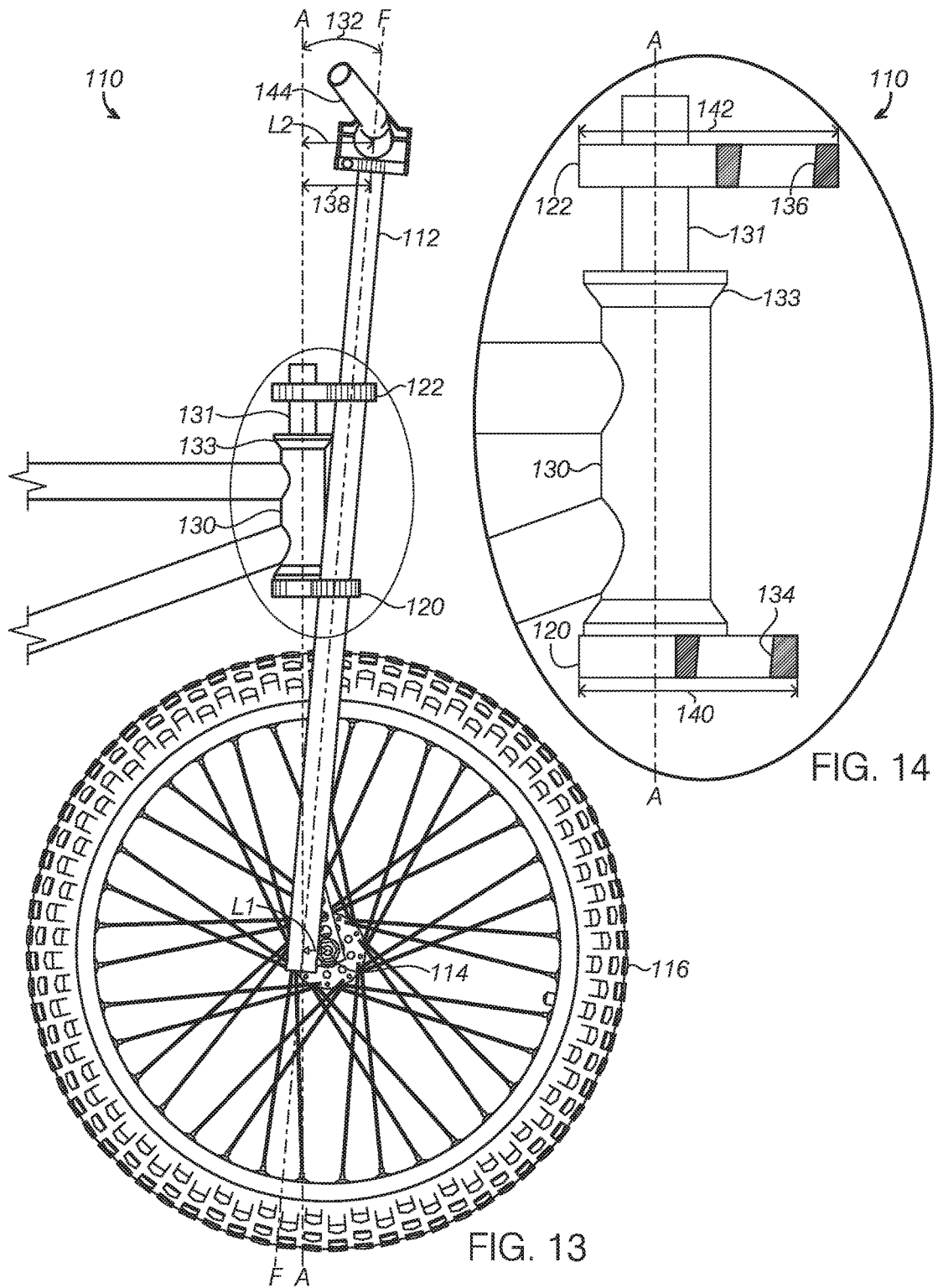
FIG. 13 is a side view of a first preferred embodiment of a steering apparatus with forward extended fork legs.
FIG. 14 is a close-up cross-sectional view of the encircled area shown in FIG. 13 with the fork legs removed for clarity.

In FIG. 13, a first horizontal distance L1 perpendicular to the steering column axis A is defined from the axis A to the wheel axle 114. A second horizontal distance L2 perpendicular to the axis A is defined from the axis A to a central portion of the handle bar 144. The steering apparatus 110 thus positions the handlebar 144 in a forwardly manner such that L2 is greater than L1. As discussed further below with respect to FIG. 26, the preferred embodiment may also comprise a zero offset mount such that the first horizontal distance L1 between the steering column axis A and the wheel axle 114 is zero or close to zero (i.e., where the steering column axis A intersects the wheel axle).

In the close-up view of FIG. 14 which omits the fork legs for clarity, the lower crown 120 comprises a pair of identical lower bores 134, positioned to the left and right of the steering column 130, that are angled to tilt the fork legs (not shown) forwardly as they extend upwardly. Similarly, the upper crown 122 comprises a pair of identical upper bores 136 that are also angled to tilt the fork legs (not shown) forwardly as they extend upwardly. Thus, the lower pair of angled bores 134 and upper pair of angled bores 136 are all configured to direct an upper portion of each corresponding fork leg received therein to extend forwardly such that the handlebar 144 supported at the top end of the fork legs is positioned a horizontal distance 138 of 1 to 12 inches to the front of and perpendicular to the axis A, as shown in FIG. 13.

In the first preferred embodiment as illustrated in FIGS. 13 and 14, the angle of the first pair of bores 134 with respect to the vertical axis A is substantially similar to the angle of the second pair of bores 136 with respect to the vertical axis A, which is substantially similar to the angle 132 of the fork legs 112 with respect to the vertical axis A as shown in FIG. 13. In the preferred embodiment, this angle 132 may be in the range of 2 degrees to 60 degrees with respect to the vertical axis A, with a more preferred range of 5 degrees to 45 degrees.

The upper crown 122 has a first forward length or depth 142 (measured from the vertical axis A) that is preferably greater than a second forward length 140 of the lower crown 120 since the upper pair of angled bores 136 are preferably positioned farther out in front of the steering column 130 than the lower pair of angled bores 134.

Due to the angled bores in the upper crown 122 and lower crown 120, the vertical spacing between the crowns 120, 122 must be precise to properly receive the pair of tilted fork legs. Accordingly, it would be preferable to enable the vertical adjustment of the crowns 120, 122, especially the vertical position of the upper crown 122 which would be assembled after the lower crown 120 is fixed in place. To enable vertical adjustment of either crown 120, 122, the apparatus 110 may include a handlebar stem coupling module such as that shown in U.S. Pat. No. 5,588,336 which is incorporated herein by reference.

In particular, a top portion 131 of the steering tube may comprise an outer sleeve enveloped over the steer tube to secure the upper and lower cups of the headset, namely, the set of components providing a rotatable relationship between the fork assembly and the head tube of the bicycle frame. This frees up the upper crown 122 to be vertically positioned anywhere along the top portion 131 of the steering tube located above the top cap 133 of the headset. Any suitable type of removable fastener or coupling mechanism may be used to removably couple the upper crown 122 to the top tube portion 131.

It should be understood that the handlebar stem coupling module described above is incorporated in the following preferred embodiments shown in FIGS. 17-27 and described below.

Figure 15:
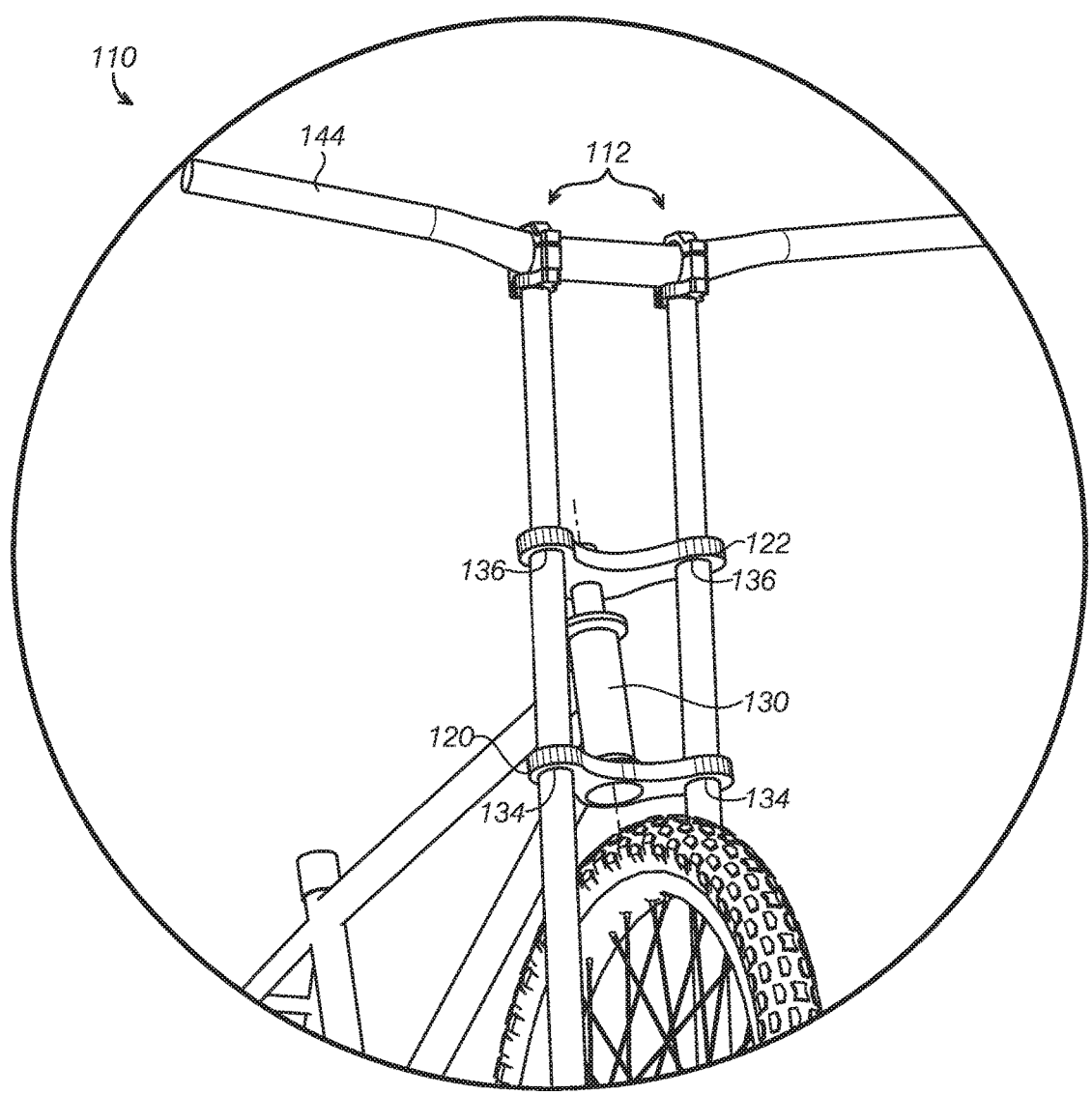
FIG. 15 is a front perspective view of the first preferred embodiment of the steering apparatus with forward extended legs.
Figure 16:
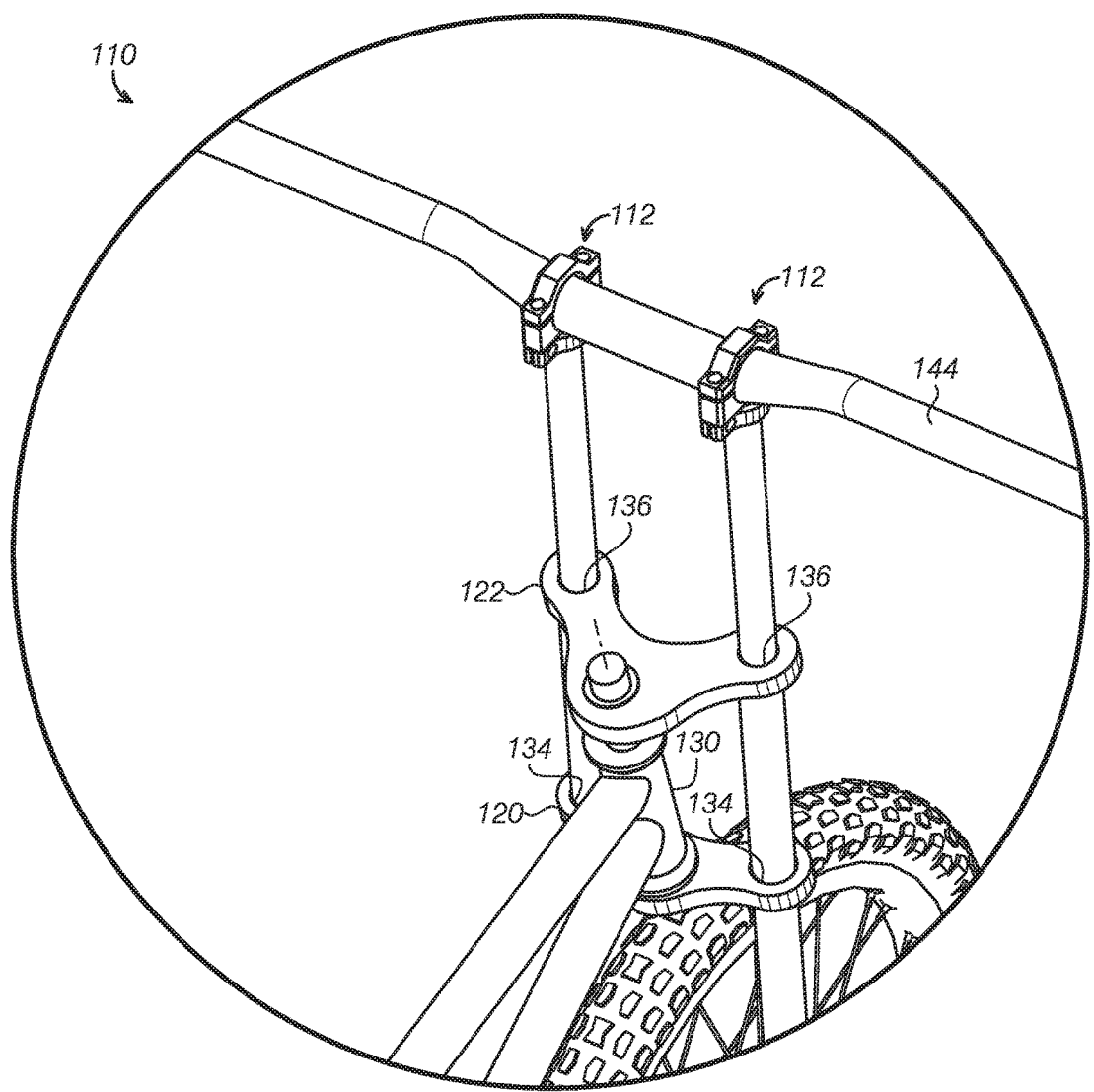
FIG. 16 is a rear perspective view of the first preferred embodiment of the steering apparatus with forward extended legs.

In FIGS. 15 and 16, the pair of lower bores 134 are disposed in front of the steering column 130. The lower crown 120 comprises a V-shape that locates the lower bores 134 to the front left and front right of the steering column 130. The upper crown 122 also comprises a V-shape that positions the upper bores 136 to the front left and front right of the steering column 130 and even farther in front than the lower bores 134.

Figure 17:
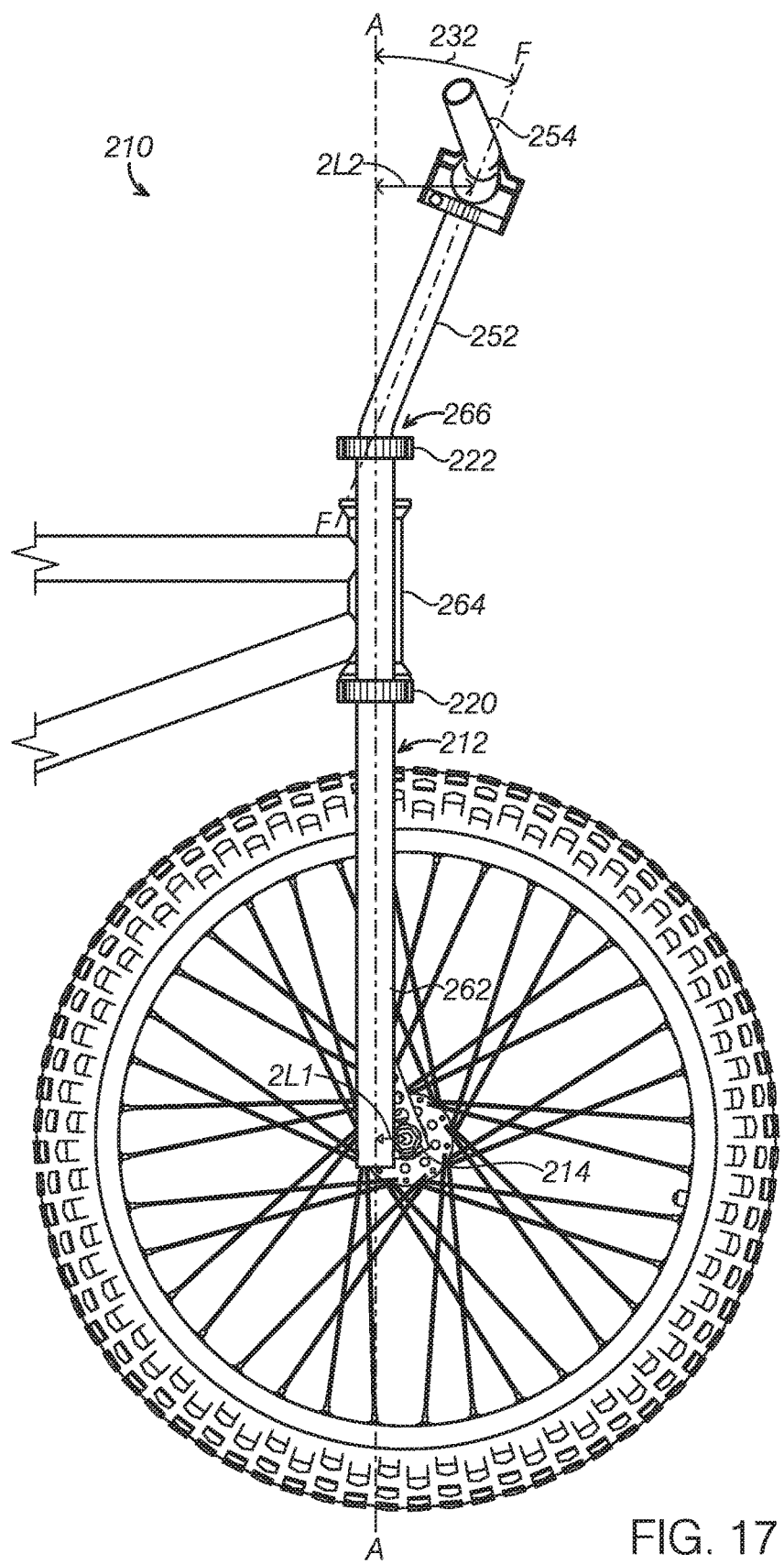
FIG. 17 is a side view of a second preferred embodiment of a steering apparatus with forward extended fork legs.
Figure 18:
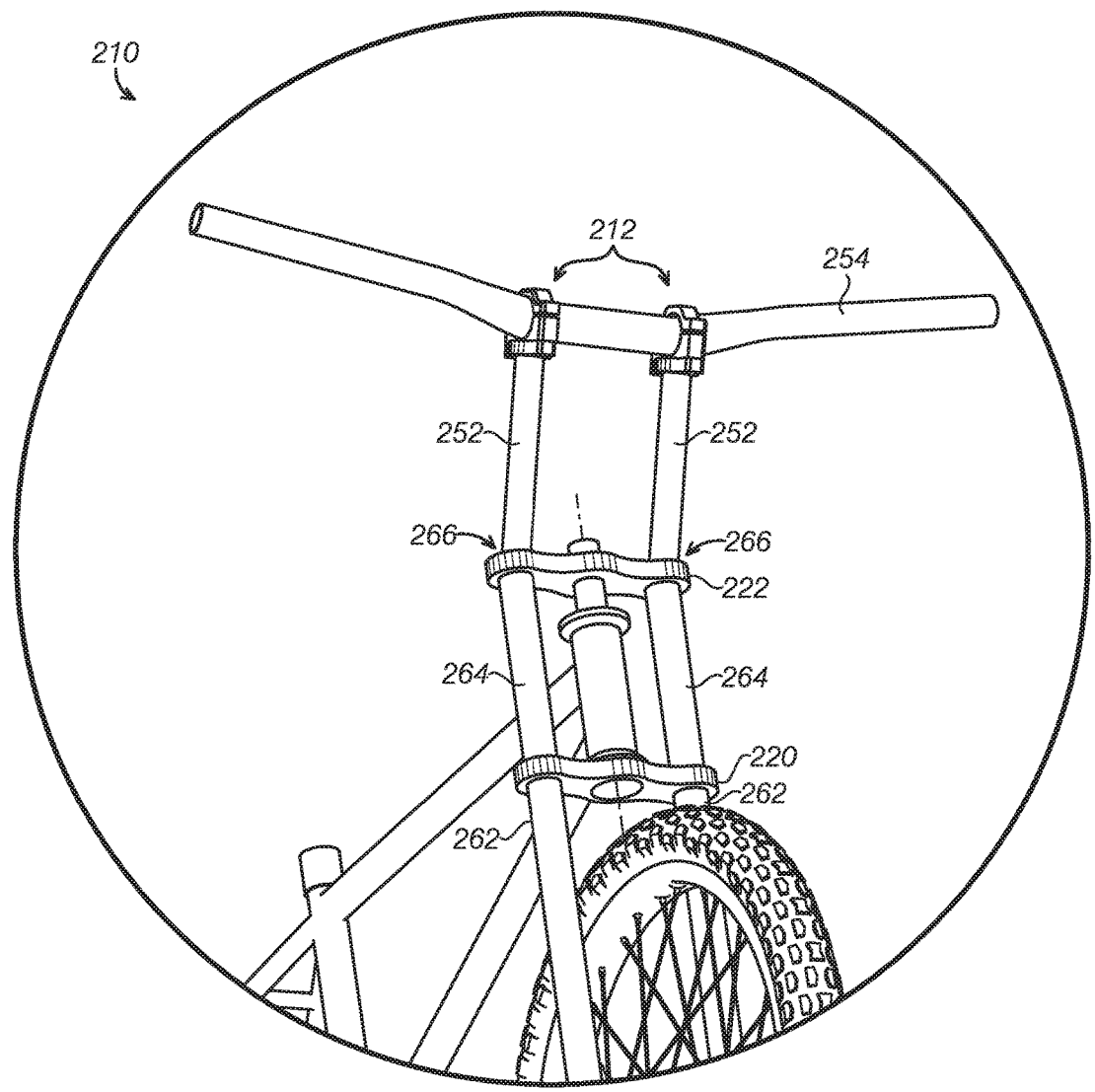
FIG. 18 is a front perspective view of the second preferred embodiment of the steering apparatus with forward extended legs.
Figure 19:
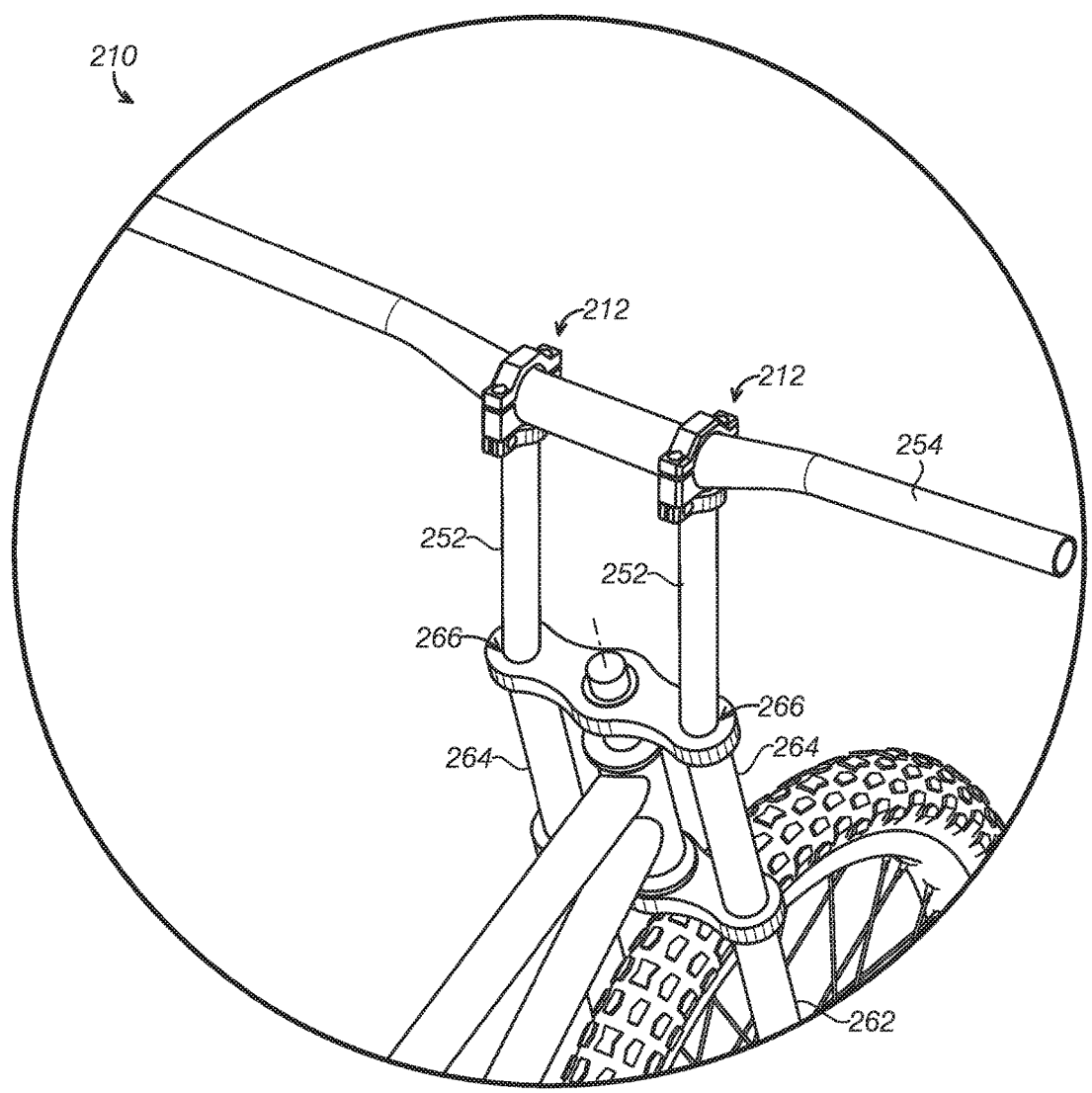
FIG. 19 is a rear perspective view of the second preferred embodiment of the steering apparatus with forward extended legs.

In FIGS. 17-19, a second preferred embodiment of a forward extended dual fork steering apparatus 210 comprises a pair of fork legs 212 with upper fork portions 252 bent towards the front of the bike so as to position the steering handlebar 254 farther in front of the steering column axis. The second preferred steering apparatus 210 comprises a steering column 230, a lower crown 220 and an upper crown 222 substantially similar to the embodiment shown in FIGS. 1, 2, 5 and 6 of U.S. patent application Ser. No. 14/815,097, the disclosures of which are fully incorporated herein by reference. Thus, in the second preferred embodiment 210, the first pair of bores 234 in the lower crown 220 and the second pair of bores 236 in the upper crown 222 are not angled. In the second preferred embodiment, the upper crown 222 is substantially similar to the lower crown 220.

The second preferred steering apparatus 210 comprises a pair of fork legs 212 also extending from the axle 214 of the front wheel 216 all the way up to the objected supported at the top, e.g., handlebar. Each fork leg comprises a lower fork portion extending beneath the lower crown, a mid-fork portion extending between the upper crown and lower crown, and a top fork portion extending above the top crown to an object supported thereon, such as a handlebar.

In the second preferred embodiment 210 of a forward extended steering apparatus, the lower fork portion 262 and mid-fork portion 264 of each fork leg 212 are aligned, substantially linear and substantially parallel to the steering column. A forward bend 266 is formed at the juncture of the mid-fork portion 264 and the top fork portion 252, adjacent to the upper crown 222, to direct the top fork portion 252 a forward distance from the axis of the steering column. In other words, the bend 266 divides the top fork portion 252 from the mid-fork portion 264 at or near the location of the upper crown 220. In the preferred embodiment, the top end of each top fork portion is positioned between 1 to 12 inches in front of and perpendicular to the steering column axis A. In the second preferred embodiment, the left and right fork legs 212 are substantially similar in structure, including the lengths of fork portions, and the location and angle of bends 266.

The angle 232 of the bend 266 is preferably between 3 degrees to 60 degrees with respect to the axis A of the mid-fork 262 and lower fork portions 262, with a more preferred range of 5 degrees to 45 degrees.

In FIG. 17, a first horizontal distance 2L1 perpendicular to the steering column axis A is defined from the axis A to the wheel axle 214. A second horizontal distance 2L2 perpendicular to the axis A is defined from the axis A to a central portion of the handle bar 254. The steering apparatus 210 thus positions the handlebar 254 in a forwardly manner such that 2L2 is greater than 2L1.

Figures 20, 21:
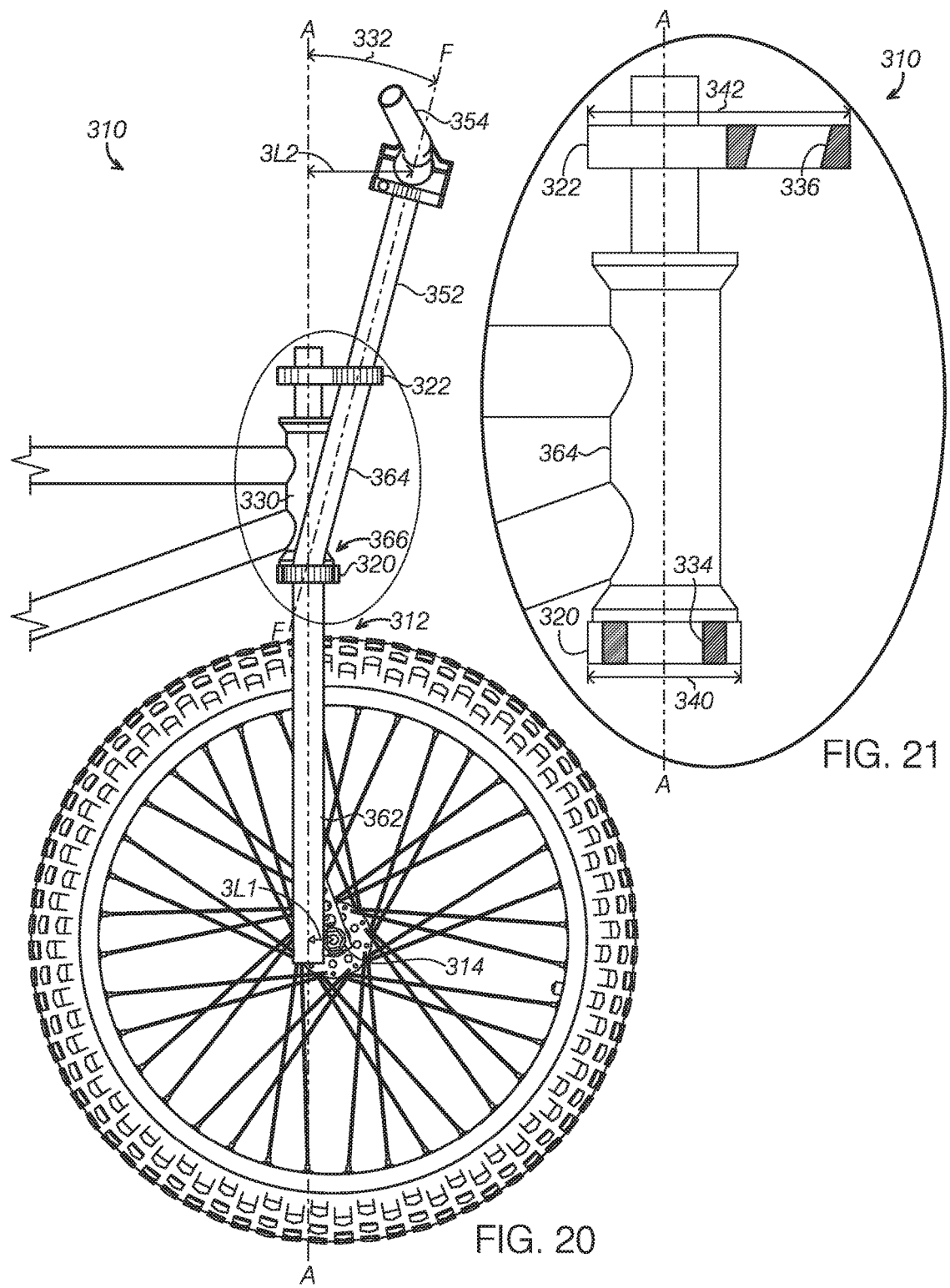
FIG. 20 is a side view of a third preferred embodiment of a steering apparatus with forward extended fork legs.
FIG. 21 is a close-up cross-sectional view of the encircled area shown in FIG. 20 with the fork legs removed for clarity.

In FIGS. 20-21, a third preferred embodiment of a forward extended dual fork steering apparatus 310 comprises a pair of fork legs 312 with a forward bend 366 formed at a base of the mid-fork portions 364. The forward leaning mid-fork portion 364 is linearly aligned with upper fork portions 352 that continue to extend towards the front of the bike so as to position the steering handlebar 354 farther in front of the steering column axis A. The third preferred steering apparatus 310 comprises a steering column 330 and a lower crown 320 substantially similar to the embodiment shown in FIGS. 1, 2, 5 and 6. The upper crown 322 comprises a greater depth so to position the pair of upper bores 336 farther out in front of the steering column 330. Thus, in the third preferred embodiment 310, the first pair of bores 334 in the lower crown 320 are not angled while the second pair of bores 336 in the upper crown 322 are angled and positioned in front of the steering column 330.

The third preferred steering apparatus 310 comprises a pair of fork legs 312 also extending from the axle of the front wheel all the way up to the objected supported at the top, e.g., handlebar. Each fork leg comprises a lower fork portion extending beneath the lower crown, a mid-fork portion extending between the upper crown and lower crown, and a top fork portion extending above the top crown to an object supported thereon, such as a handlebar.

In the third preferred embodiment 310 of a forward-extended steering apparatus, the upper fork portion 352 and mid-fork portion 364 of each fork leg 312 are aligned and substantially linear. A forward bend 366 is formed at the juncture of the mid-fork portion 364 and the lower fork portion 362, adjacent to the lower crown 320, to direct the mid-fork portion 352 and top fork portion 364 a forward distance from the axis of the steering column. In other words, the bend 366 divides the mid-fork portion 264 from the lower fork portion at or near the location of the lower crown 320. In the preferred embodiment, the top end of each top fork portion is positioned between 1 to 12 inches in front of and perpendicular to the steering column axis A. In the third preferred embodiment, the left and right fork legs 312 are substantially similar in structure, including the lengths of fork portions, and the location and angle of bends 366.

The angle 332 of the bend 366 is preferably between 3 degrees to 60 degrees with respect to the axis A of the steering column 330 and lower fork portions 362, with a more preferred range of 5 degrees to 45 degrees.

In FIG. 20, a first horizontal distance 3L1 perpendicular to the steering column axis A is defined from the axis A to the wheel axle 314. A second horizontal distance 3L2 perpendicular to the axis A is defined from the axis A to a central portion of the handle bar 354. The steering apparatus 310 thus positions the handlebar 354 in a forwardly manner such that 3L2 is greater than 3L1.

Figures 22, 23:
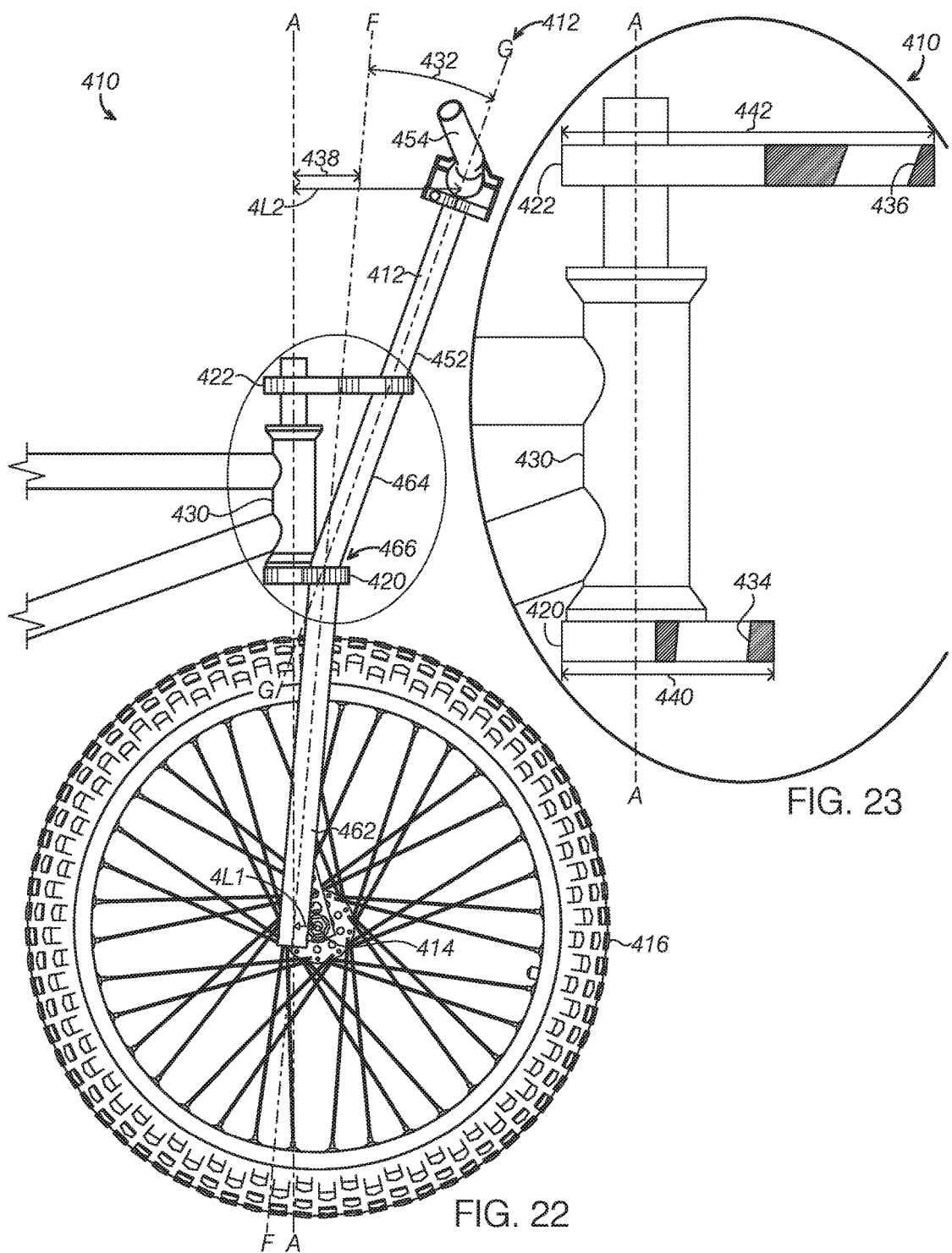
FIG. 22 is a side view of a fourth preferred embodiment of a steering apparatus with forward extended fork legs.
FIG. 23 is a close-up cross-sectional view of the encircled area shown in FIG. 22 with the fork legs removed for clarity.

In FIGS. 22-23, a fourth preferred embodiment of a forward extended dual fork steering apparatus 410 comprises a pair of fork legs 412 with a forward bend 466 formed at a base of the mid-fork portions 464. In this preferred embodiment, the lower fork portions 462 are also forward leaning. An angle 432 between axis F of the lower fork portions 462 and axis G of the upper fork leg portions is defined in the range of 0 to 60 degrees, with a more preferred range of 5 degrees to 45 degrees. Accordingly, the lower crown 420 defines a pair of angled lower bores 434 while the upper crown 422 defines a pair of upper bores 436 with an even greater angle directing the fork legs forwardly and upwardly. The forward leaning mid-fork portion 464 is linearly aligned with upper fork portions 452 that continue to extend towards the front of the bike so as to position the steering handlebar 454 farther in front of the steering column axis A.

A lower crown 420 and an upper crown 422 are coupled to the steering column 430. The lower crown 420 comprises an increased depth 440 in the preferred range of 35 to 65 mm to accommodate the forward leaning lower fork portions 462. The upper crown 422 comprises an greater depth 442 than that of the lower crown 420 in the preferred range of 40 to 100 mm so as to position the upper bores 436 farther out in front of the steering column 430. Thus, in the fourth preferred embodiment 410, the first pair of bores 434 in the lower crown 420 comprise a lesser upwardly forward angle than that of the second pair of bores 436 in the upper crown 422.

The fourth preferred forward-extended steering apparatus 410 comprises a pair of fork legs 412 also extending from the axle of the front wheel all the way up to the objected supported at the top, e.g., handlebar. Each fork leg comprises a lower fork portion extending beneath the lower crown, a mid-fork portion extending between the upper crown and lower crown, and a top fork portion extending above the top crown to an object supported thereon, such as a handlebar.

In the fourth preferred embodiment 410 of the forward-extended steering apparatus, the upper fork portion 452 and mid-fork portion 464 of each fork leg 412 are aligned and substantially linear, and define an axis G with an even greater angle in the range of 5 to 65 degrees from the axis A. A forward bend 466 is formed at the juncture of the mid-fork portion 464 and the lower fork portion 462, adjacent to the lower crown 420, to direct the mid-fork portion 452 and top fork portion 464 a forward distance from the axis A of the steering column. In other words, the bend 466 divides the mid-fork portion 464 from the lower fork portion 462 at or near the location of the lower crown 420. In the preferred embodiment, the top end of each top fork portion is positioned between 1 to 12 inches in front of and perpendicular to the steering column axis A. In the fourth preferred embodiment, the left and right fork legs 412 are substantially similar in structure, including the lengths of fork portions, and the location and angle of bends 466.

In FIG. 22, a first horizontal distance 4L1 perpendicular to the steering column axis A is defined from the axis A to the wheel axle 414. A second horizontal distance 4L2 perpendicular to the axis A is defined from the axis A to a central portion of the handle bar 454. The steering apparatus 410 thus positions the handlebar 454 in a forwardly manner such that 4L2 is greater than 4L1.

It will be appreciated that the fourth preferred embodiment provides even more room or space around the steering column 430 by virtue of the forward extended lower fork legs 462 and a forward bend 466 that directs the mid-fork portions 464 and upper fork portions 452 even farther in front so as clear more space for the user's knees.

Figure 24:
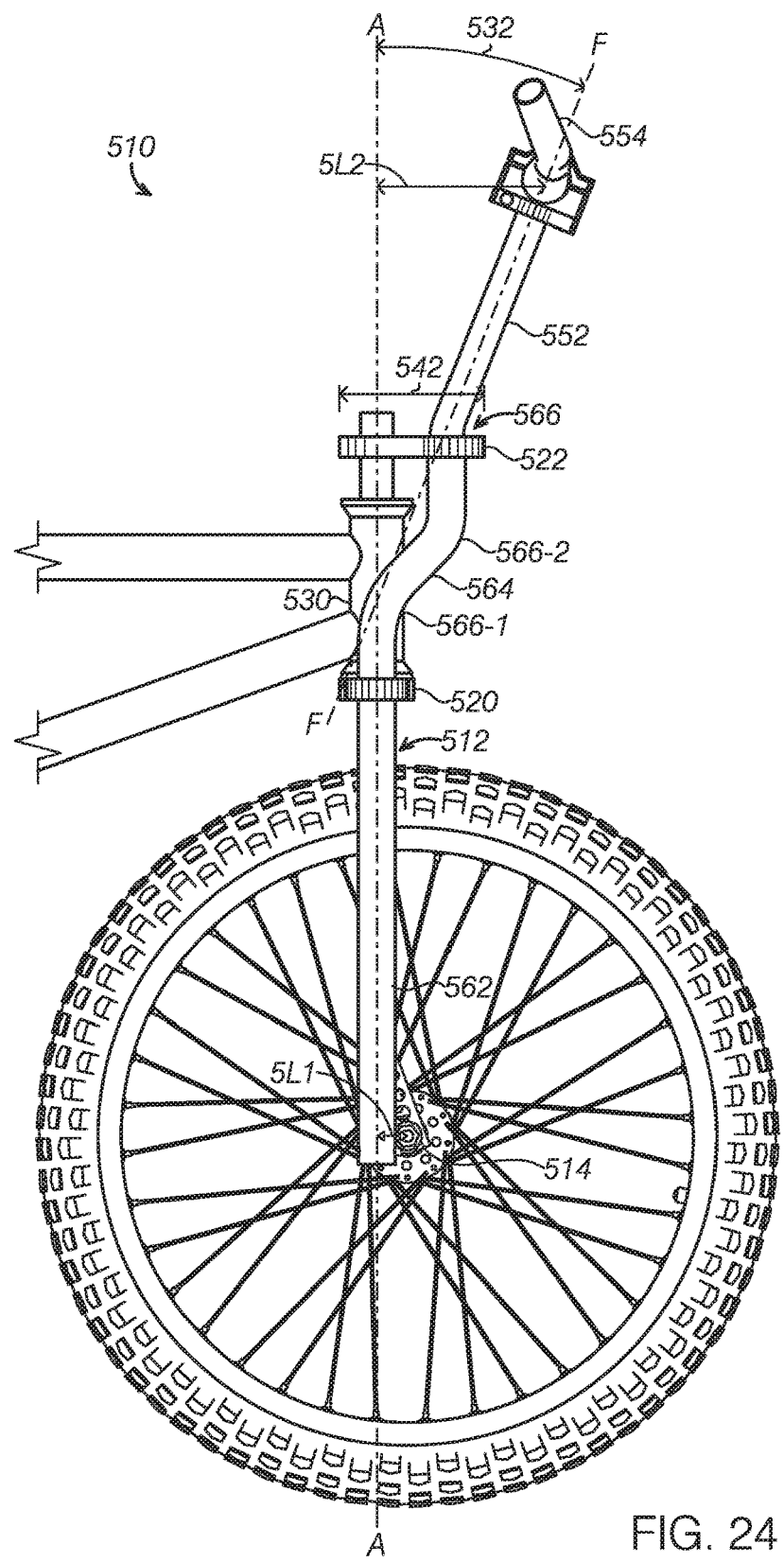
FIG. 24 is a side view of a fifth preferred embodiment of a steering apparatus with forward extended fork legs.

In FIG. 24, a fifth preferred embodiment of a forward extended dual fork steering apparatus 510 provides extra clearance room near the steering column 530 without positioning the handlebar excessively forward. To accomplish this, an S-shaped mid-fork portion 564 is employed having two bends, a lower forward-directing bend 566-1 and an upward-directing bend 566-2 located above the lower bend 566-1.

The forward extended steering apparatus 510 comprises a pair of fork legs 512 each having a dual bend formed in the mid-fork portions 464. Accordingly, the lower crown 520 defines a pair of lower bores 534 without angles, similar to the embodiment shown in FIGS. 1, 2, 5 and 6.

The upper crown 522 defines a pair of upper non-angled bores 536 and comprises a depth 542. The forward leaning mid-fork portion 564 is linearly aligned with upper fork portions 552 that continue to extend towards the front of the bike so as to position the steering handlebar 554 farther in front of the steering column axis A.

A lower crown 520 and an upper crown 522 are coupled to the steering column 430. The lower crown 520 positions comprises a pair of lower bores to the left and right of the steering column 530. The upper crown 522 comprises an greater depth 542 than that of the lower crown 520 in the preferred range of 40 to 150 mm so as to position the upper bores farther out in front of the steering column 530. Thus, in the fifth preferred embodiment 510, the first pair of bores 534 in the lower crown 520 comprise a lesser upwardly forward angle than that of the second pair of bores 536 in the upper crown 522.

In FIG. 24, a first horizontal distance 5L1 perpendicular to the steering column axis A is defined from the axis A to the wheel axle 514. A second horizontal distance 5L2 perpendicular to the axis A is defined from the axis A to a central portion of the handle bar 554. The steering apparatus 510 thus positions the handlebar 554 in a forwardly manner such that 5L2 is greater than 5L1.

The fifth preferred steering apparatus 510 comprises a pair of fork legs 512 also extending from the axle of the front wheel all the way up to the objected supported at the top, e.g., handlebar. Each fork leg comprises a lower fork portion extending beneath the lower crown, a mid-fork portion extending between the upper crown and lower crown, and a top fork portion extending above the top crown to an object 554 supported thereon, such as a handlebar 554. In this preferred embodiment, the top fork portions 552 extend at an angle 532 with respect to the axis A of the steering column 530 preferably in the range of 3 to 60 degrees.

Figure 25:
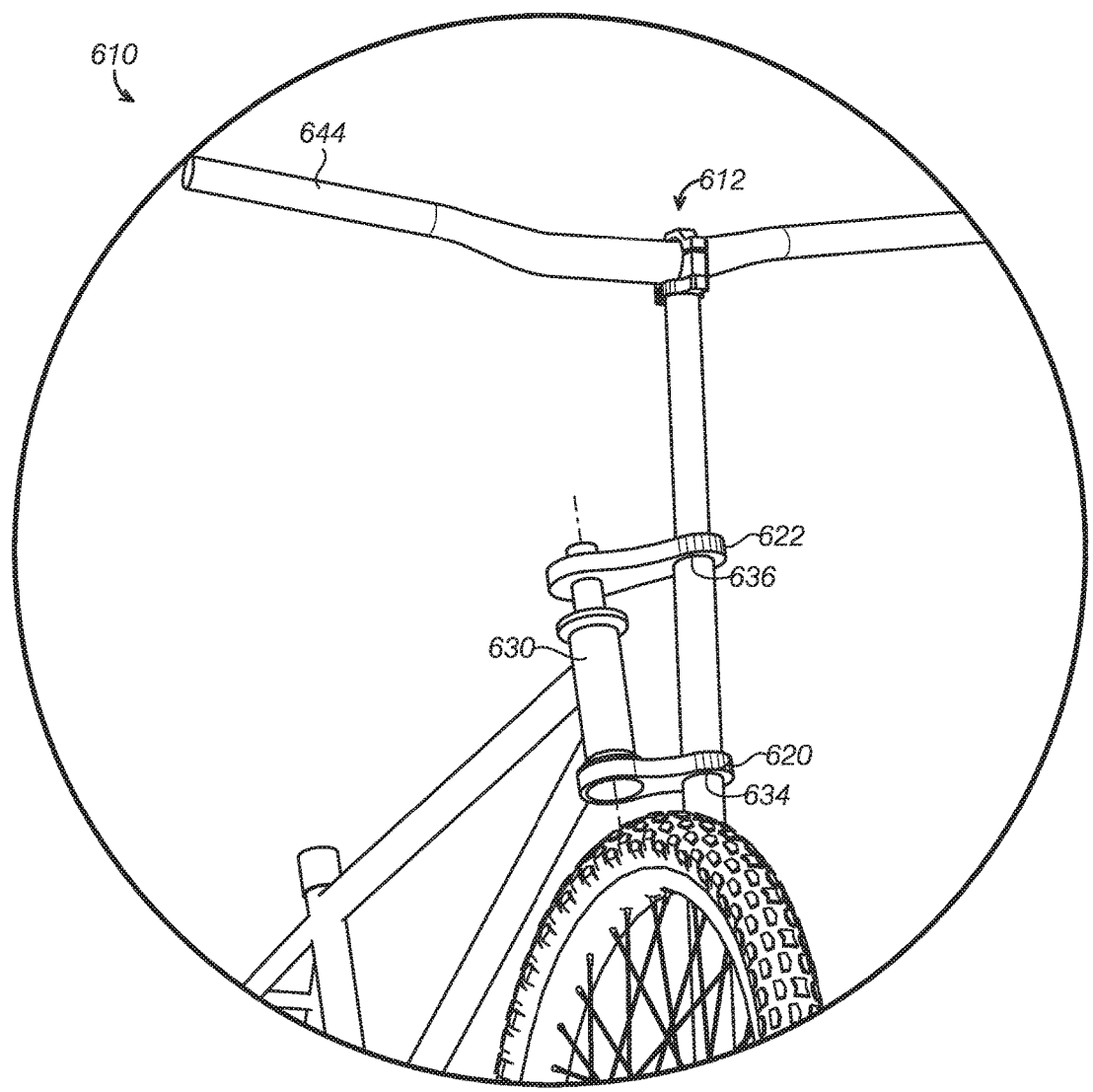
FIG. 25 is a front perspective view of a sixth preferred embodiment of a steering apparatus having a single fork leg.
Figure 26:
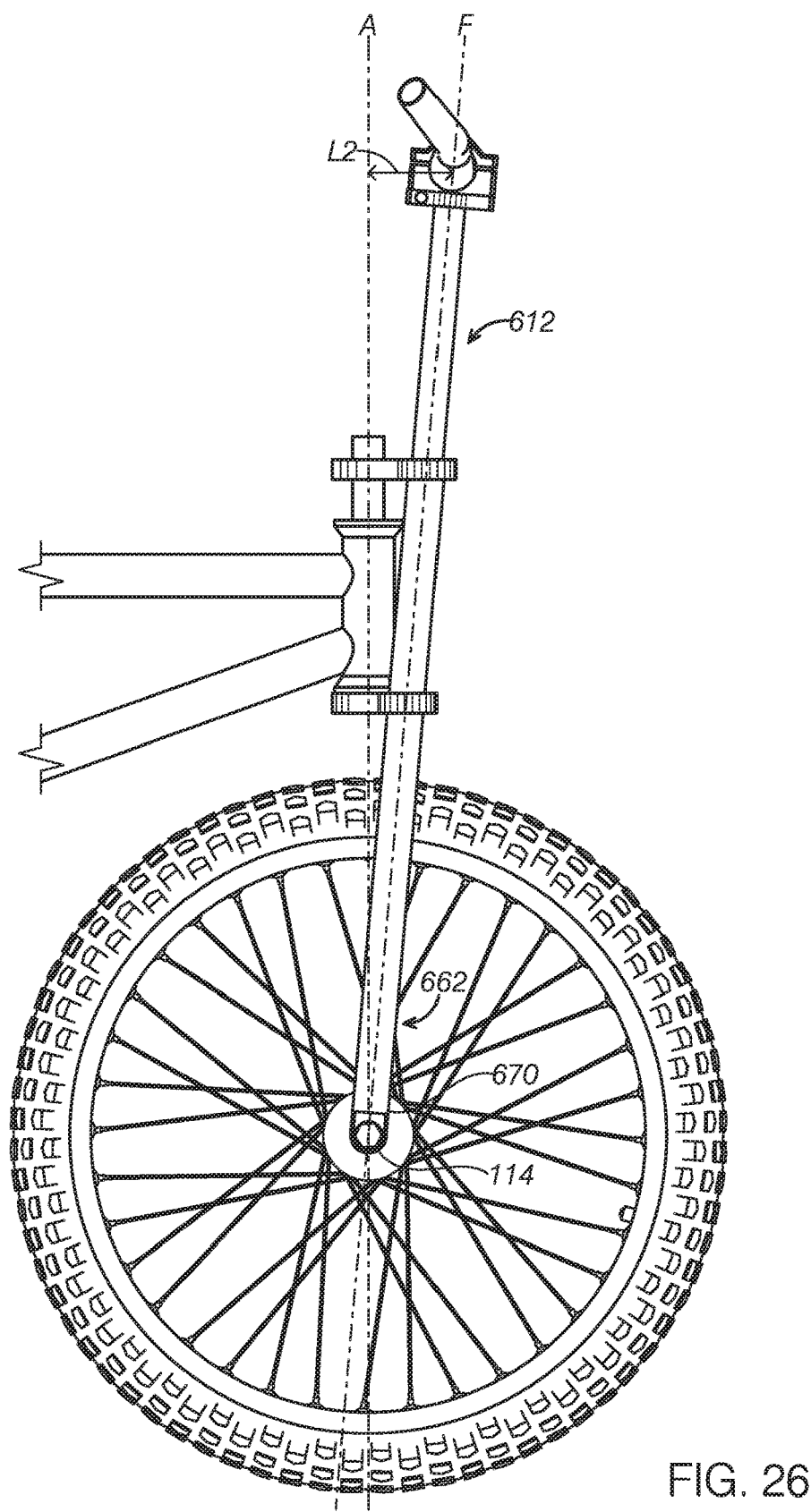
FIG. 26 is a side view of a preferred embodiment of a steering apparatus having a wheel mount with zero offset.

In FIG. 25, a sixth preferred embodiment of a forward extended fork steering apparatus 610 is substantially similar to the first preferred embodiment of a forward extended dual fork steering apparatus 110 shown in FIG. 13 except that the steering apparatus 610 comprises a single fork leg 612. The steering apparatus 610 comprises a lower crown 620 and an upper crown 622 that receive the single fork leg 612 extending upwardly and forwardly from a wheel axle. The lower crown 620 and the upper crown 622 are coupled to a steering column 630 that defines a vertical axis A that is generally perpendicular to the ground upon which a wheel of the bicycle rolls. The singular fork leg 612 defines an axis F that diverges upwardly and forwardly from the steering column axis A. Alternatively stated, the fork leg axis F downwardly converges toward the steering column axis A.

In this preferred embodiment, a first horizontal distance perpendicular to the steering column axis A is defined from the axis A to the wheel axle. A second horizontal distance perpendicular to the axis A is defined from the axis A to a central portion of the handle bar. The steering apparatus 610 thus positions the handlebar 644 in a forwardly manner such that second horizontal distance is greater than first horizontal distance, in the same manner that L2 is greater than L1 in FIG. 13.

In the foregoing embodiments, the lower fork portion comprises an offset wheel mount coupled to the axle of the front tire. In a preferred embodiment in FIG. 26, the fork leg lower portion 662 may comprise a zero offset wheel mount 670 that is coupled to the front wheel axle 114 and linearly aligned with the axis F of the fork leg. In this preferred embodiment shown in FIG. 26, the distance between the steering column axis A and the wheel axle 114 can be zero or close to zero since the steering column axis A intersects the wheel axle 114. It is to be expressly understood that such a preferred zero offset wheel mount may be employed in any of the foregoing embodiments.

In all of the foregoing embodiments, the angles of the crown bores may be modified so as to provide different horizontal distances L1, L2. Where greater distance is desired between the steering column axis A and the handlebar, L2, the bores may be formed with a greater angle. For example, compared to the embodiment in FIG. 13 which is shown from a right side view, the fork leg assembly would be rotated more clockwise.

Figure 27:
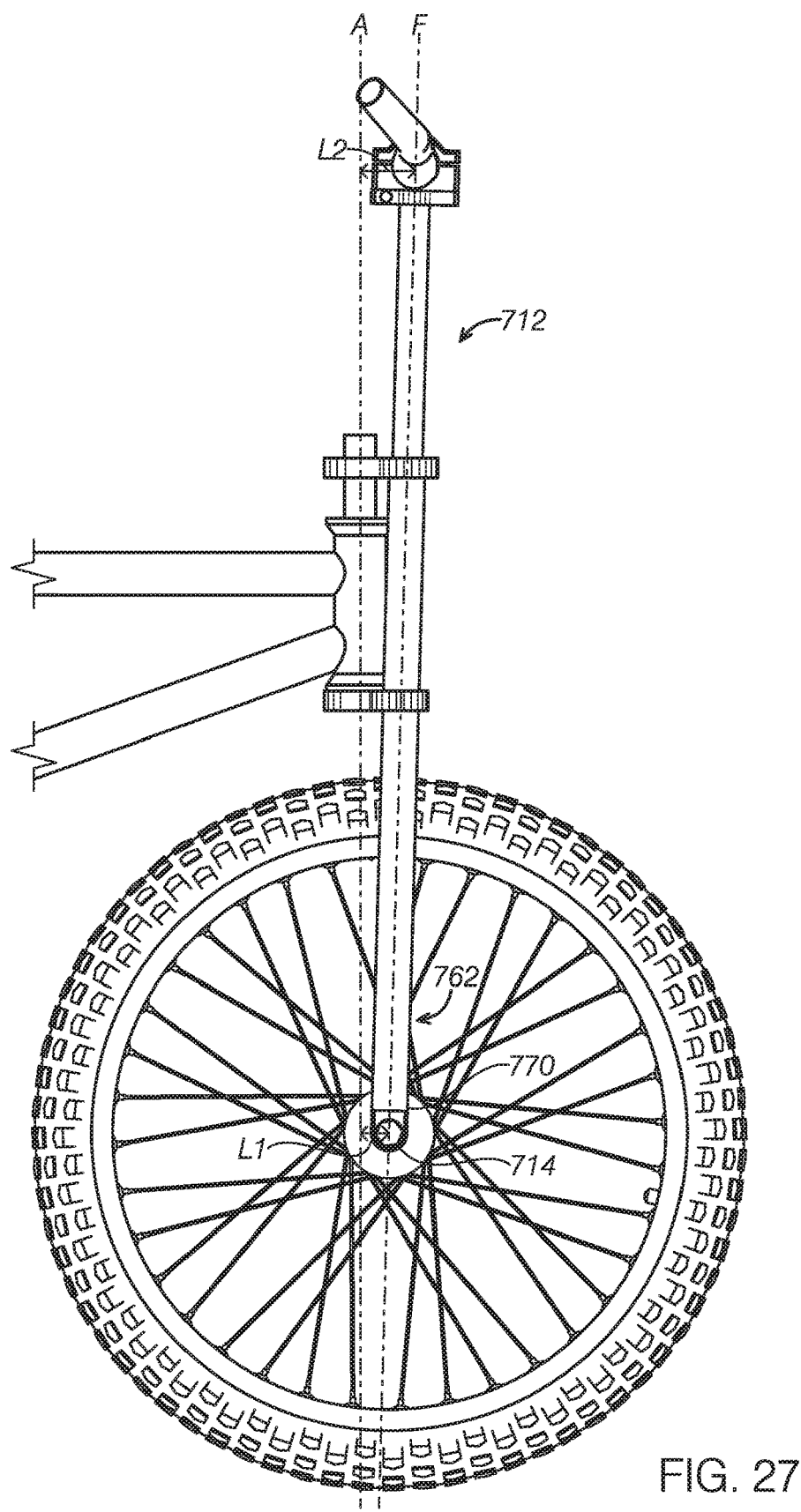
FIG. 27 is a side view of a preferred embodiment of a steering apparatus with the zero offset wheel mount and differently angled bores in the crowns.

Alternatively, where a lesser L2 distance is desired, the crown bores may be formed with a lesser angle. As shown in FIG. 27, a preferred embodiment of a fork leg with a zero offset wheel mount is slightly rotated counterclockwise (from the illustrated right side view) such that the wheel mount is positioned slightly in front of the steering column axis. The distance L1 of the wheel axle 714 in front of the steering column axis A may range from 25 mm to 45 mm. In all preferred embodiments, L2 will still preferably be greater than L1.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements. The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. An apparatus for steering a wheel having a wheel axle, comprising:
   a steering column defining an axis and a first horizontal distance extending perpendicularly from the axis to the wheel axle;
   a first fork leg extending along a first side of the steering column, the first fork leg comprising a first fork portion; and
   wherein the first fork portion extends upwardly and forwardly from the steering column, and
   wherein the first fork leg is configured to removably support and position an object above an upper terminus of the first fork portion, the object positioned a second horizontal distance extending perpendicularly from the axis to the object, wherein the second horizontal distance is greater than the first horizontal distance.

2. The apparatus of claim 1, further comprising:
   a second fork leg extending along a second side of the steering column, the second fork leg comprising a second fork portion extending upwardly and forwardly from the steering column to removably support and position the object.

3. The apparatus of claim 2, wherein:
   the steering column defines a first axis; and
   the first fork portion comprises a first top fork portion;

the second fork portion comprises a second top fork portion; and the first top fork portion and the second top fork portion collectively define a top fork end position in the range of 1 to 12 inches in front of and perpendicular to the first axis.

4. The apparatus of claim 2, wherein:
the first fork leg is substantially linear; and
the second fork leg is substantially linear.

5. The apparatus of claim 2, wherein:
the first fork leg comprises a first bend that directs the first fork portion forward with respect to the steering column; and
the second fork leg comprises a second bend that directs the second fork portion forward with respect to the steering column.

6. The apparatus of claim 5, wherein:
the first fork portion comprises a first top fork portion;
the second fork portion comprises a second top fork portion;
the first bend is formed between the first top fork portion and a first mid-fork portion; and
the second bend is formed between the second top fork portion and a second mid-fork portion.

7. The apparatus of claim 6, wherein:
the first fork portion comprises the first mid-fork portion;
the second fork portion comprises the second mid-fork portion;
the first bend is formed between the first mid-fork portion and a first lower fork portion; and
the second bend is formed between the second mid-fork portion and a second lower fork portion.

8. The apparatus of claim 2, wherein:
the first fork portion comprises a first mid-fork portion having a first lower forward-directed bend and a first upwardly-directed bend above the first lower forward-directed bend; and
the second fork portion comprises a second mid-fork portion having a second lower forward-directed bend and a second upwardly-directed bend above the second lower forward-directed bend.

9. The apparatus of claim 1, wherein the first horizontal distance comprises a range from 0 mm to 45 mm.

10. An apparatus for steering a wheel having a wheel axle, comprising:
a steering column comprising a top end, defining a first axis and defining a first horizontal distance extending perpendicularly from the axis to the wheel axle;
a first fork leg extending along a first side of the steering column, the first fork leg comprising a first fork portion; and
wherein the first fork portion is positioned in front of the steering column, and
wherein the first fork leg is configured to removably support and position an object above an upper terminus of the first fork portion, the object positioned a second horizontal distance extending perpendicularly from the first axis to the object, wherein the second horizontal distance is greater than the first horizontal distance.

11. The apparatus of claim 10, further comprising:
a second fork leg extending along a second side of the steering column, the second fork leg comprising a second fork portion positioned in front of the steering column and configured to removably support and position the object.

12. The apparatus of claim 11, wherein:
the first fork leg is substantially linear; and
the second fork leg is substantially linear.

13. The apparatus of claim 11, wherein:
the first fork leg comprises a first bend that directs the first fork portion forward with respect to the steering column; and
the second fork leg comprises a second bend that directs the second fork portion forward with respect to the steering column.

14. The apparatus of claim 13, wherein:
the first fork portion comprises a first top fork portion; and
the second fork portion comprises a second top fork portion.

15. The apparatus of claim 14, wherein:
the first fork leg comprises a first lower fork portion and a first mid-fork portion that collectively define a first fork axis;
the first bend comprises a first range of 3 degrees to 60 degrees with respect to the first fork axis;
the second fork leg comprises a second lower fork portion and a second mid-fork portion that collectively define a second fork axis; and
the second bend comprises a second range of 3 degrees to 60 degrees with respect to the second fork axis.

16. The apparatus of claim 13, wherein:
the first fork portion comprises a first mid-fork portion; and
the second fork portion comprises a second mid-fork portion.

17. The apparatus of claim 10, further comprising:
a lower crown coupled to the steering column, the lower crown defining a first angled bore; and
an upper crown coupled to the steering column, the upper crown defining a second angled bore.

18. The apparatus of claim 10, wherein the first horizontal distance comprises a range from 0 mm to 45 mm.

19. An apparatus for steering a wheel having a wheel axle, comprising:
a steering column comprising a top end, defining a first axis and defining a first horizontal distance extending perpendicularly from the axis to the wheel axle;
a lower crown coupled to the steering column;
an upper crown coupled to the steering column;
a first fork leg extending along a first side of the steering column, the first fork leg comprising a first top fork portion and a first mid-fork portion;
a steering handle bar removably coupled to the first top fork portion and positioned above an upper terminus of the first top fork portion, the steering handle positioned a second horizontal distance extending perpendicularly from the first axis such that the second horizontal distance is greater than the first horizontal distance,
wherein the first mid-fork portion extends upwardly and forwardly from the top end of the steering column.

20. The apparatus of claim 19, further comprising:
a second fork leg extending along a second side of the steering column, the second fork leg comprising a second top fork portion and a second mid-fork portion extending upwardly and forwardly from the top end of the steering column, and
wherein the steering handle bar is removably coupled to the second top fork portion.

21. The apparatus of claim 20, wherein:
the first fork leg is substantially linear; and
the second fork leg is substantially linear.

22. The apparatus of claim 20, wherein:
the first fork leg comprises a first bend that directs the first mid-fork portion forward with respect to the steering column; and
the second fork leg comprises a second bend that directs the second mid-fork portion forward with respect to the steering column.

23. The apparatus of claim 19, wherein the first horizontal distance comprises a range from 0 mm to 45 mm.

* * * * *